United States Patent
Diamond et al.

(10) Patent No.: US 9,336,907 B2
(45) Date of Patent: May 10, 2016

(54) PRESSURE-TUBE REACTOR WITH COOLANT PLENUM

(75) Inventors: William T. Diamond, Deep River (CA); Metin Yetisir, Deep River (CA); Romney Duffey, Idaho Falls, ID (US); Laurence Leung, Deep River (CA)

(73) Assignee: Atomic Energy of Canada Limited, Chalk River, Province of Ontario (CA)

( * ) Notice: Subject to any disclaimer, the term of this patent is extended or adjusted under 35 U.S.C. 154(b) by 291 days.

(21) Appl. No.: 13/641,603

(22) PCT Filed: Feb. 14, 2011

(86) PCT No.: PCT/CA2011/000165
§ 371 (c)(1),
(2), (4) Date: Dec. 21, 2012

(87) PCT Pub. No.: WO2011/130821
PCT Pub. Date: Oct. 27, 2011

(65) Prior Publication Data
US 2013/0089174 A1 Apr. 11, 2013

(51) Int. Cl.
*G21C 15/00* (2006.01)
*G21C 1/10* (2006.01)
(Continued)

(52) U.S. Cl.
CPC .. *G21C 1/10* (2013.01); *G21C 1/20* (2013.01); *G21C 13/04* (2013.01); *G21C 15/02* (2013.01); *G21C 15/20* (2013.01); *Y02E 30/40* (2013.01)

(58) Field of Classification Search
CPC .................................... G21C 1/10; G21C 1/20
USPC ........................................................ 376/366
See application file for complete search history.

(56) References Cited

U.S. PATENT DOCUMENTS

| 3,053,746 A | 9/1962 | Challender et al. |
| 3,071,527 A | 1/1963 | Young |

(Continued)

FOREIGN PATENT DOCUMENTS

| CA | 2174983 | 10/1997 |
| EP | 0282600 | 1/1992 |

(Continued)

OTHER PUBLICATIONS

Lamarsh and Baratta Introduction to Nuclear Engineering, Third edition, 2001, pp. 163-168.*

(Continued)

*Primary Examiner* — Jack W Keith
*Assistant Examiner* — Sharon M Davis
(74) *Attorney, Agent, or Firm* — Buchanan Ingersoll & Rooney PC

(57) ABSTRACT

A pressure-tube nuclear reactor can include an outer shell having an interior to contain a moderator at a first pressure and a coolant plenum to receive the coolant fluid at a second pressure, the second pressure being greater than the first pressure. The reactor also includes a plurality of pressure tubes. Each pressure tube is received within and extends through a corresponding shell tube and is configured to releasably retain at least one fuel bundle. A first end of each pressure tube being coupled to the plenum tubesheet in fluid communication with the plenum chamber and a second end of each pressure tube fluidly connected to a coolant conduit to enable the coolant fluid to flow between the coolant plenum and each pressure tube and to flow from the nuclear reactor for further processing.

37 Claims, 15 Drawing Sheets

(51) Int. Cl.
*G21C 1/20* (2006.01)
*G21C 13/04* (2006.01)
*G21C 15/02* (2006.01)
*G21C 15/20* (2006.01)

(56) References Cited

U.S. PATENT DOCUMENTS

| | | | |
|---|---|---|---|
| 3,128,234 A | | 4/1964 | Cage, Jr. et al. |
| 3,179,571 A | | 4/1965 | Schabert et al. |
| 3,240,678 A | * | 3/1966 | Hemmerle et al. ............ 376/352 |
| 3,318,777 A | | 5/1967 | Kervenoael et al. |
| 3,350,273 A | * | 10/1967 | Van Der Laken ............ 376/291 |
| 3,365,370 A | | 1/1968 | Helbling |
| 3,453,178 A | * | 7/1969 | Winkler et al. ............... 376/375 |
| 3,801,443 A | * | 4/1974 | Yasukawa et al. ............ 376/267 |
| 4,046,627 A | * | 9/1977 | Middleton .................... 376/282 |
| 4,056,440 A | | 11/1977 | Macbeth |
| 4,094,737 A | * | 6/1978 | Greischel et al. ............. 376/286 |
| 4,259,993 A | * | 4/1981 | Scholz .......................... 138/149 |
| 4,305,458 A | | 12/1981 | Jogand |
| 4,726,926 A | | 2/1988 | Patterson et al. |
| 4,795,608 A | | 1/1989 | Nylund |
| 4,826,653 A | | 5/1989 | Nylund et al. |
| 4,842,804 A | * | 6/1989 | Hopkins ....................... 376/203 |
| 4,911,880 A | * | 3/1990 | Kasai et al. ................... 376/371 |
| 5,154,880 A | | 10/1992 | Oosterkamp |
| 5,640,434 A | * | 6/1997 | Rottenberg ................... 376/366 |
| 5,892,806 A | * | 4/1999 | Scott ............................ 376/362 |
| 6,053,652 A | * | 4/2000 | Deaver et al. .................. 403/24 |
| 6,236,701 B1 | | 5/2001 | Nylund |
| 6,526,115 B2 | | 2/2003 | Kataoka et al. |
| 2013/0121452 A1 | | 5/2013 | Bodner et al. |
| 2015/0155059 A1 | | 6/2015 | Yetisir et al. |
| 2015/0155060 A1 | | 6/2015 | Yetisir et al. |
| 2015/0206604 A1 | | 7/2015 | Pencer et al. |

FOREIGN PATENT DOCUMENTS

| | | |
|---|---|---|
| EP | 0798745 | 10/1997 |
| GB | 803701 | 10/1958 |
| GB | 820579 | 9/1959 |
| JP | 63309894 | 12/1988 |
| JP | 1083187 | 3/1989 |
| JP | 2010197 | 1/1990 |
| WO | 9741565 | 11/1997 |

OTHER PUBLICATIONS

Spinks, N.J., "CANDU Nuclear Power Reactors," Thermopedia, Feb. 8, 2011, DOI: 10.1615/AtoZ.c.candu_nuclear_power_reactors.*
PCT/CA2011/000165 International Search report dated May 18, 2011 (3 pages).
International Preliminary Report on Patentability issued on PCT/CA2011/000459 on Oct. 23, 2012 by the International Bureau of WIPO.
Yetisir et al, Development and Integration of Canadian SCWR Concept With Counter-Flow Fuel Assembly. The 6th International Symposium on Supercritical Water-Cooled Reactors, ISSCWR-6, Mar. 7, 2013, Shenzhen, Guangdong, China.
Zhao et al, Code Design Study of a Supercritical Light Water Reactor with Double Row Fuel Rods. The 3rd China-Canada Joint Workshop on Supercritical-Water-Cooled Reactors, Apr. 18-20, 2012, Xi'an, China.
Roshd et al, Nuclear Fuel Bundle Design with Reduced Void Effect. ANS Transactions 26, 1977, pp. 603-604.
Chow et al, Conceptual Fuel Channel Designs for CANDU-SCWR. Nuclear Engineering and Technology, 2007, pp. 139-146, vol. 40, No. 2.
International Search Report issued on International Application No. PCT/CA2011/000459 mailed on Aug. 3, 2011.
Buongiorno et al, Study of Solid Moderators for the Thermal-Spectrum Supercritical Water-Cooled Reactor. Nuclear Technology, Mar. 2006, pp. 282-303, vol. 153.
Canada's Nuclear Science and Technology Journal: Special Issue on Small Reactors, Dec. 2012, vol. 1, No. 2.
Yetisir et al, SuperSafe Reactor© (SSR): A Supercritical Water-Cooled Small Reactor. 2nd International Technical Meeting on Small Reactors, Nov. 7-9, 2012, Ottawa, Ontario, Canada.
Pencer et al, Axial and Radial Graded Enrichment Options for the Canadian SCWR. The 3rd China-Canada Joint Workshop on Supercritical-Water-Cooled Reactors, CCSC-2012, Apr. 18-20, 2012, Xi'an, China.
International Preliminary Report on Patentability issued on PCT/CA2013/050446 on Dec. 16, 2014 by the International Bureau of WIPO.
International Search Report issued on International Application No. PCT/CA2013/050446 mailed on Sep. 3, 2013.
International Preliminary Report on Patentability issued on PCT/CA2013/050449 on Dec. 16, 2014 by the International Bureau of WIPO.
International Search Report issued on International Application No. PCT/CA2013/050449 mailed on Aug. 29, 2013.
International Preliminary Report on Patentability issued on PCT/CA2013/050447 on Dec. 16, 2014 by the International Bureau of WIPO.
International Search Report issued on International Application No. PCT/CA2013/050447 mailed on Sep. 3, 2013.
Supplementary European Search Report and Annex to the European Search Report on European Patent Application No. EP 13 80 4526.5, dated Feb. 24, 2016 (10 pages).
Supplementary European Search Report and Annex to the European Search Report on European Patent Application No. EP 13 80 3781.7, dated Feb. 5, 2016 (9 pages).
Supplementary European Search Report and Annex to the European Search Report on European Patent Application No. EP 13 80 39862, dated Feb. 3, 2016 (10 pages).

* cited by examiner

PRESSURE-TUBE REACTOR WITH COOLANT PLENUM

This application is a National Stage of International Application No. PCT/CA2011/000165, filed Feb. 14, 2011, which claims the benefit of Provisional Application No. 61/327,472, filed Apr. 23, 2010, each of those applications being incorporated herein in their entirety by reference.

FIELD

This invention relates to nuclear reactors, and more particularly to nuclear reactors having coolant flowing through pressure tubes.

INTRODUCTION

Commercial nuclear power plants are known. Based on the mechanical design of the pressure retaining components of the reactor core, commercial nuclear reactors can be grouped as either "pressure-vessel" or "pressure-tube" type reactors. Examples of a pressure-vessel type reactor are Pressurized Water Reactors (PWR) and Boiling Water Reactors (BWR). In these reactor designs nuclear fuel is contained in a large pressure vessel. The coolant and the moderator fluid are the same fluid and thus there is no need to maintain two different fluids separated from one another within the pressure vessel. The single fluid can be supplied to the pressure vessel using an inlet plenum and withdrawn from the vessel using an outlet plenum. In such designs there is no need to isolate a coolant fluid from a separate or different moderator fluid, consequently the plenums need not feed a plurality of separate, sealed fuel channels.

In some pressure vessel designs moderator and coolant are separated through the use of flow channels, but these flow channels are not pressurized (i.e. do not form a pressure boundary) and some leakage between the coolant and the moderator is acceptable because both the coolant and the moderator are the same fluid.

Traditional, horizontal type pressure-tube nuclear reactors are known. Some existing commercial pressure-tube type reactors include a plurality of individual fuel channels extending horizontally through a low pressure vessel containing a heavy water moderator. Nuclear fuel bundles are placed within the pressure tube inside the fuel channel. A coolant fluid is circulated through the pressure tube and is heated by nuclear fission.

Existing reactor designs, both of the pressure-vessel and pressure-tube type, cannot readily be adapted for use with a supercritical fluid, e.g. water, as the coolant and heat transfer medium. For a supercritical fluid, this specification and the present invention propose a configuration of pressure tubes, suitable for use with such a fluid. To reach a supercritical state, the coolant fluid will be maintained at high pressures (for example at pressures greater than 23 MPa) and at elevated temperatures. Existing pressure tube designs cannot withstand such high pressures, and existing pressure tube materials can be prone to increased corrosion and wear when exposed to supercritical fluids. Simply increasing the size or thickness of existing pressure tubes may not be possible due to tube spacing requirements and may affect reactor efficiency.

Creating pressure vessels for existing reactor designs to withstand high pressures and correspondingly high temperatures can be costly and difficult, and exposure to supercritical fluid flows can erode exposed portions of the pressure vessel walls, which may lead to increased maintenance and premature failure.

Coolant feeder pipes (coolant inlet pipes and coolant outlet pipes) in some existing commercial pressure tube type reactors are an integral part of the primary heat transport system, connecting the in-reactor fuel channels to the headers with heat transport pipes. The low pressure vessel commonly has separate calandria tubes, providing passages for the pressure tubes through calandria vessel, and the pressure tubes extend through the calandria tubes. Garter springs maintain spacing between each pair of a calandria tube and a pressure tube, and define an annulus.

SUMMARY

This summary is intended to introduce the reader to the more detailed description that follows and not to limit or define any claimed or as yet unclaimed invention. One or more inventions may reside in any combination or sub-combination of the elements or process steps disclosed in any part of this document including its claims and figures.

According to one broad aspect of the invention, a pressure-tube nuclear reactor includes an outer shell that has a first shell tubesheet, at least one shell side wall and a second shell tubesheet that cooperate to define an interior to contain a moderator at a first pressure. The outer shell can also include a plurality of shell tubes extending from the first shell tubesheet, through the interior to the second shell tubesheet. The nuclear reactor also includes a coolant plenum that has a plenum cover, at least one plenum side wall and a plenum tubesheet that cooperate to define a plenum chamber to contain a coolant fluid. The plenum chamber being to receive the coolant fluid at a second pressure, the second pressure being greater than the first pressure. The nuclear reactor also includes a plurality of pressure tubes. Each pressure tube is received within and extends through a corresponding shell tube. Each pressure tube is configured to releasably retain at least one fuel bundle. A first end of each pressure tube is coupled to the plenum tubesheet in fluid communication with the plenum chamber and a second end of each pressure tube is fluidly connected to a coolant conduit to enable the coolant fluid to flow between the coolant plenum and each pressure tube and to flow from the nuclear reactor for further processing.

Both the plurality of shell tubes and the plurality of pressure tubes may extend substantially vertically.

The plenum cover may be detachably connected to the at least one plenum side wall to allow simultaneous access to the plenum chamber and the respective first ends of the plurality of pressure tubes.

The plenum may be an inlet plenum fluidly connected to at least one coolant supply conduit to receive the coolant fluid and direct the coolant fluid into the plurality of pressure tubes.

The first end of each pressure tube defines a pressure tube inlet and the second end of each pressure tube defines a pressure tube outlet, each pressure tube outlet is fluidly connected to a coolant outlet conduit.

The coolant outlet conduit comprises at least one riser, a first end of the at least one riser being fluidly connected to a coolant collection header and a second end of the at least one riser being coupled to the plurality of pressure tube outlets, the at least one riser supported by coupling the first end of the at least one riser being coupled to a riser support to allow second end of the at least one riser to accommodate thermal expansion.

Each pressure tube outlet may be fluidly connected to the coolant outlet conduit using expansion joints.

The plurality of pressure tubes and the plurality of shell tubes may have a neutron absorption cross-section between 150-300 mb.

The first pressure may be less than 1 MPa and the second pressure may be between 8-15 MPa so that the coolant fluid is a subcritical fluid.

The first pressure may be less than 1 MPa and the second pressure may be between 23-28 MPa so that the coolant fluid exiting the second end of each pressure tube is a supercritical fluid.

The plenum chamber may be sized to hold a pre-determined volume of coolant fluid so that in use, substantially all radiation shielding for a portion of the nuclear reactor covered the coolant plenum is provided by the coolant plenum and the pre-determined volume of coolant fluid.

The reactor may also include an expansion bellows disposed between the coolant plenum and the outer shell to accommodate thermal expansion of at least one of the coolant plenum, the pressure tubes and the outer shell.

An annular space is defined each shell tube and each corresponding pressure tube enabling a fluid to flow in each annular space between the shell tube and the corresponding pressure tube.

The reactor may also include a fluid plenum in fluid communication with at least one fluid supply conduit to supply the fluid to the fluid plenum, the fluid plenum in fluid communication with a first end of each annular space and a fluid outlet conduit in fluid communication with a second end of each annular space so that the fluid from the fluid plenum can flow through each annular space and be withdrawn via the corresponding fluid outlet conduit.

The fluid plenum may be defined between the plenum tubesheet and the first shell tubesheet of the outer shell.

The second end of each pressure tube may be coupled to the outer shell by a respective tube expansion bellows to accommodate for longitudinal growth of each pressure tube.

The coolant fluid may be heavy water or light water and the moderator is heavy water.

According to another broad aspect of the invention, a pressure-tube nuclear reactor includes an outer shell that has an first shell tubesheet, at least one shell side wall and a second shell tubesheet that cooperate to define an interior to contain a moderator at a first pressure. The nuclear reactor also includes a coolant plenum having a plenum cover, at least one plenum side wall and a plenum tubesheet that cooperate to define a plenum chamber to receive a coolant fluid at a second pressure. The second pressure i greater than the first pressure. The nuclear reactor also includes a plurality of pressure tubes received within and extending through the interior of the outer shell from the first shell tubesheet to at least the second shell tubesheet. Each pressure tube is configured to releasably retain at least one fuel bundle. A first end of each pressure tube is coupled to the plenum tubesheet in fluid communication with the plenum chamber and a second end of each pressure tube is fluidly connected to a coolant conduit to enable the coolant fluid to flow though between the coolant plenum and each pressure tube and to flow from the nuclear reactor for further processing.

The plurality of pressure tubes may extend substantially vertically through the interior of the outer shell.

The plenum tubesheet may include the first shell tubesheet of the outer shell.

The reactor may also include an insulator disposed within each pressure tube to inhibit heat transfer between the coolant fluid and the pressure tube.

Each insulator may include at least one ceramic insulator liner loosely received within each pressure tube.

The plenum cover may be detachably connected to the at least one plenum side wall to allow simultaneous access to the plenum chamber and the respective first ends of the plurality pressure tubes.

The nuclear reactor of any one of claims 18 to 23, wherein the plenum is an inlet plenum fluidly connected to at least one coolant supply conduit to receive the coolant fluid and direct the coolant fluid into the plurality of pressure tubes.

The first end of each pressure tube may defines a pressure tube inlet and the second end of each pressure tube defines a pressure tube outlet, each pressure tube outlet fluidly connected to a coolant outlet conduit.

The coolant outlet conduit may include at least one riser, a first end the at least one riser being fluidly connected to a coolant collection header and a second end of the at least one riser being coupled to the plurality of pressure tube outlets, the at least one riser supported by coupling the first end of the at least one riser being coupled to a riser support to allow second end of the at least one riser to accommodate thermal expansion.

Each pressure tube outlet may be fluidly connected to the coolant outlet conduit using expansion joints.

The first pressure may be less than 1 MPa and the second pressure may be between 8-15 MPa so that the coolant fluid is a subcritical fluid.

The first pressure may be less than 1 MPa and the second pressure may be between 23-28 MPa so that the coolant fluid exiting the second end of each pressure tube is a supercritical fluid.

The plenum chamber may be sized to hold a pre-determined volume of coolant fluid so that in use, substantially all radiation shielding for a portion of the nuclear reactor covered the coolant plenum is provided by the coolant plenum and the pre-determined volume of coolant fluid.

The reactor may also include an expansion bellows disposed between the coolant plenum and the outer shell to accommodate thermal expansion of at least one of the coolant plenum, the pressure tubes and the outer shell.

The plurality of pressure tubes may have a neutron absorption cross-section between 150-300 mb.

The second end of each pressure tube may be coupled to the outer shell by a respective tube expansion bellows to accommodate for longitudinal growth of each pressure tube.

The coolant fluid may be heavy water or light water and the moderator is heavy water.

The reactor may also include a second coolant plenum that has a second plenum tubesheet coupled to the second ends of the plurality of pressure tubes and a second plenum chamber to receive the coolant fluid from the plurality of pressure tubes and direct the coolant fluid to the coolant outlet conduit.

According to another broad aspect of the invention, a coolant containment system for a nuclear reactor includes a plenum having a connection for connecting to a coolant processing system and a plurality of pressure tubes connected at one end thereof to the plenum. The pressure tubes are adapted to receive nuclear fuel bundles and to be mounted within a moderator. A second connection connected to other end of the pressure tubes is for connecting to the coolant processing system, whereby coolant can be circulated through the coolant processing system, the plenum and the pressure tubes.

The plenum may include a detachable plenum cover to provide access to the pressure tubes to enable the fuel bundles to be inserted into and removed from the pressure tubes.

Features of each broad aspect of the invention may be combined together in a plurality of combinations and sub-combinations.

DRAWINGS

For a better understanding of the examples of the reactors described herein and to show more clearly how they may be carried into effect, reference will now be made, by way of example only, to the accompanying drawings which show at least one exemplary embodiment, and in which.

Figure 1:
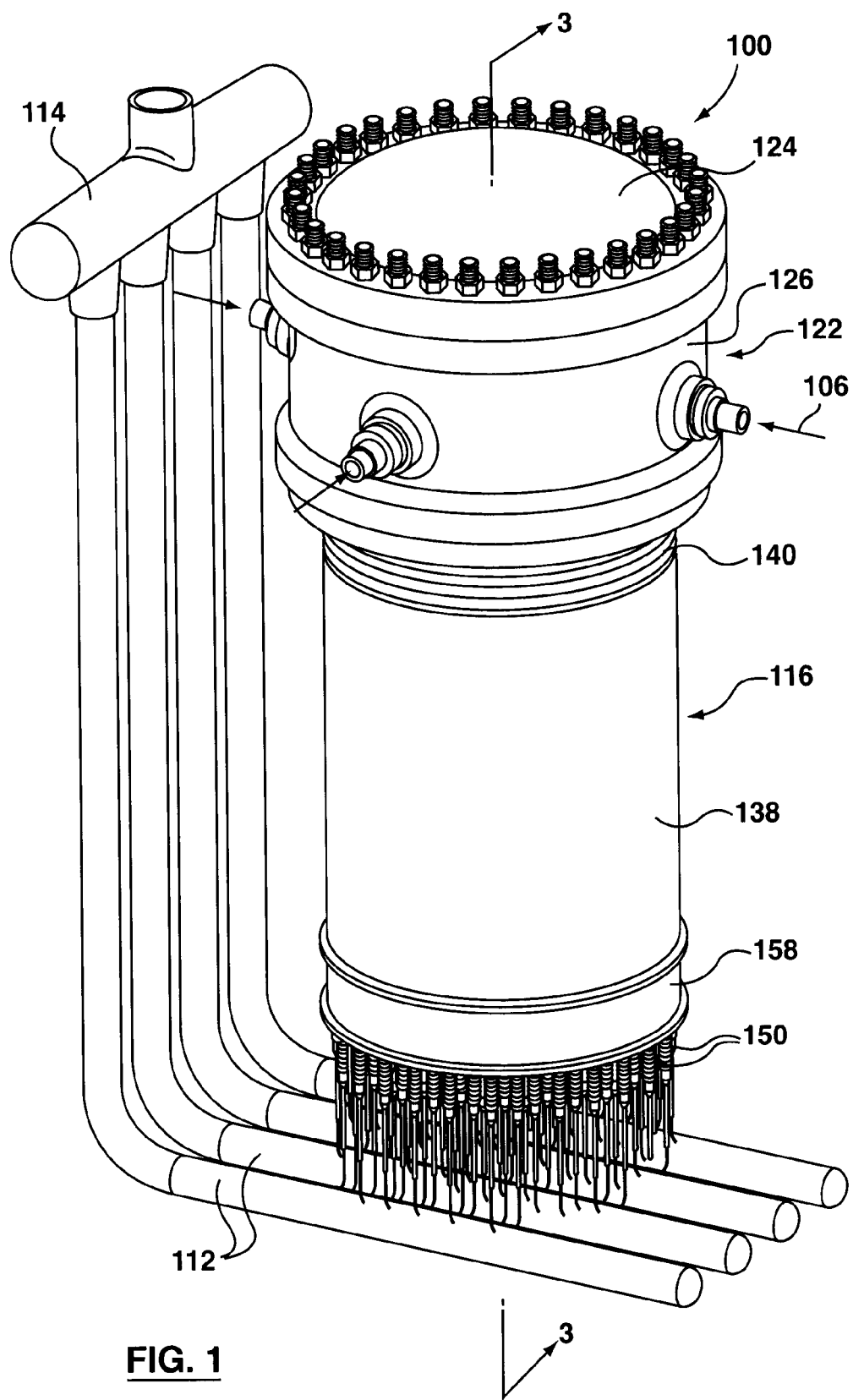
FIG. 1 is an isometric view of an example of a pressure-tube nuclear reactor.

For simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

Various apparatuses or processes will be described below to provide an example of an embodiment of each claimed invention. No embodiment described below limits any claimed invention and any claimed invention may cover processes or apparatuses that are not described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim or dedicate to the public any such invention by its disclosure in this document.

This specification generally describes a pressure-tube type nuclear reactor having a low pressure (i.e. approximately atmospheric). In the examples describe herein the moderator is a fluid moderator, for example heavy water moderator. In other examples, the moderator can be any suitable moderator, fluid or solid, including for example, a graphite based solid moderator. It is to be understood that the present invention may be generally applicable to any pressure-tube type reactor.

According to one aspect of the described reactor, the pressure-tube reactor is configured such that the pressure tubes, or fuel channels, extend in a substantially vertical direction, as opposed to the substantially horizontal arrangement of some existing pressure-tube reactors.

According to another aspect of the described reactor, a plurality of coolant supply feeders and associated piping that are commonly used on some commercial pressure-tube type reactors, to supply coolant to the pressure tubes, have been replaced with a single coolant supply header or plenum that supplies coolant to each pressure tube in the reactor. Examples of reactors embodying one or more of these aspects are described herein.

Referring to FIGS. 1-7, one example of a pressure-tube type nuclear reactor 100 is shown. The reactor 100 includes a plurality of fuel channels, including pressure tubes 102, each of which is configured to receive nuclear fuel material, for example a standard nuclear fuel bundles 104, and contain a pressurized flow of coolant fluid, as represented by a plurality of arrows 106. While reference in this described example, is made to fuel bundles, it will be understood that any suitable fuel assembly may be used. The pressure tubes 102 can withstand the expecting operating temperatures and pressures of the nuclear reactor 100, have low neutron absorption characteristics (as explained in more detail below) and include a fuel bundle holder or fuel holding apparatus (not shown) that is adapted to receive one or more fuel bundles 104.

Each pressure tube 102 defines opposing first and second ends. The first end of each pressure tube 102 is connected to the plenum and the second end of each pressure tube is connected to another flow conduit or pipe. Which end of the pressure tube is considered the "inlet" of the pressure tube is determined by the flow direction of the coolant flowing through the tube as described below. It is understood that any suitable fuel channel can be used in combination with the examples described herein.

A moderator to moderate the nuclear fission, optionally a liquid 108 or a solid material as known in the art, surrounds the fuel channels. The fluid system containing the coolant is self-contained and separated from the moderator liquid 108 so that there is no mixing between the coolant and the moderator liquid in the reactor 100. The moderator liquid 108 is held at a first pressure while the coolant fluid, within the pressure tubes 102, is maintained at a second pressure that is greater than the first pressure.

Figure 4:
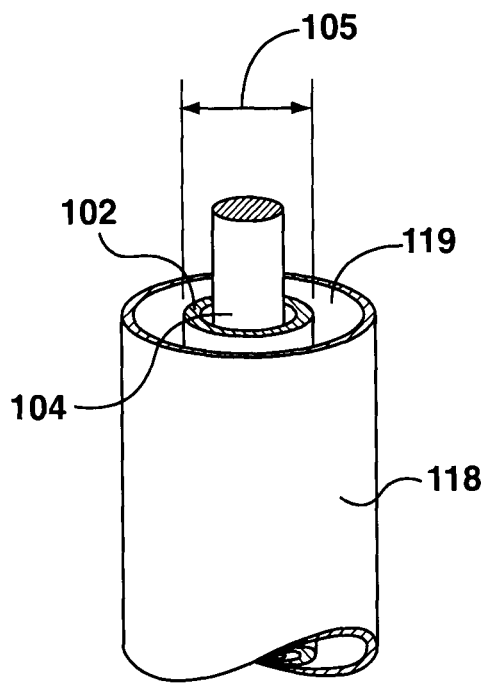
FIG. 4 is a schematic representation of one example of a pressure tube surrounded by a calandria tube that can be used in the reactor of FIG. 1.

Each fuel channel, or pressure tube 102 is sized to accommodate standard fuel bundles known in the art, shown schematically as fuel bundle 104 in FIG. 4 and can have a diameter 105 between 2-10 inches, and in some examples between 3-5 inches. Optionally, the pressure tubes 102 (and corresponding reactor features) can be of different sizes. Providing pressure tubes 102 of different sizes may provide flexibility in reactor design for desired fuel behaviour under normal and accident conditions.

Coolant fluid is circulated through the reactor within a coolant containment system. The coolant containment system operates as a self-contained system that is separate from the moderator containment system. The coolant supply system includes any suitable elements through which coolant fluid is routed, including, for example pumps, heat exchangers, turbines, condensers. The coolant inlet plenum and pressure tubes described herein can also form part of the coolant containment system. For example, in the illustrated examples coolant 106 is supplied to the reactor 100 by a coolant supply conduit, for example supply pipes (not shown), and is removed from the reactor by a coolant outlet conduit or drain, for example risers 112 that are connected to a collection header 114, for further processing within the coolant containment system (e.g., for steam generation). In some examples, the coolant 106 circulated through the pressure tubes 102, around the fuel bundles 104, is deuterium oxide (which is also referred to as heavy water or $D_2O$). In other examples, the coolant 106 can be light water, i.e. standard $H_2O$. It is understood that as the coolant 106 flows around the fuel bundles 104 it is heated by the energy released from the nuclear fission in the fuel bundles 104 and the heated light or heavy water is usually passed through a heat exchanger (not shown) to produce steam which drives turbines (not shown) for electricity generation. As an alternative to steam generation via heat exchangers, steam or supercritical coolant can be generated directly in the fuel channels and send to turbines for electricity generation.

The fuel bundles 104 used in the reactor 100 can contain natural or un-enriched uranium as known in the art. In other examples, the reactor 100 can be configured to use fuel bundles 104 containing enriched uranium, lightly-enriched Uranium, Thorium and Plutonium, in mixed oxide, carbide forms or inert fuel matrices, plus bundles with actinides Am and Cu, and/or fertile elements such as Th232, and U238, including previously used or recycled fuels as in the known state of the art.

In some cases, the coolant 106 enters and exits the pressure tubes 102 as a subcritical fluid, for example at a pressure between 8-15 MPa and having an exit temperature between 275-350 degrees Celsius. Optionally, the coolant 106 has a pressure between 10-12 MPa and an exit temperature between 300-320 degrees Celsius.

In other examples, as exemplified in FIGS. 8-13, the reactor 100 can be operated/configured so that the coolant 106 enters the pressure tubes 102 as a subcritical fluid and exits the pressure tubes 102 as a supercritical fluid, for example at a pressure between 23-28 MPa and at an exit temperature between 500-650 degrees Celsius. In such examples the reactor 100 may be described as a supercritical water reactor. Operating the reactor 100 as a supercritical water reactor may increase the thermal efficiency of the overall power plant (including the reactor 100 and the power generation turbines).

In such examples, the materials used to construct the pressure tubes 102 and other downstream components (for example risers 112 and collection header 114) can be selected to have the material properties necessary to handle such supercritical flow conditions, including, for example zirconium alloys, stainless steel alloys and corrosion resistant superalloys, with or without coatings. Optionally, the composition and/or treatment of the pressure tubes 102 can vary along the length of the tubes (i.e., the upper portion of the tubes exposed to the subcritical flow can have a different composition and/or treatment than the lower portion of the tubes that is exposed to the supercritical flow).

The pressure tubes 102 are surrounded by, and contained within the interior of an outer shell or vessel, for example calandria vessel 116, that contains a heavy water moderator fluid 108, as known in the art. It is understood that the heavy water within the calandria 116 can be at approximately atmospheric pressure, and that the calandria vessel 116 can be considered a low pressure vessel, typically operating at pressures less then 1 MPa. The vessel wall thickness, material and other characteristics can be selected based on the operating conditions of a particular reactor, as known in the art.

Conventional commercial pressure-tube type reactors can a plurality of horizontally oriented pressure tubes, each of which is connected to a separate coolant inlet pipe or feeder and a separate coolant outlet feeder. As known in the art, on-line refueling of some horizontal commercial pressure tube type reactors is often done using automated refueling robots. The spacing or pitch between adjacent, horizontal pressure tubes can be determined primarily by physics parameters, but may also be influenced by the external piping requirements (for the inlet and outlet feeders) as well functional limitations of the refueling robots (i.e., enough clearance must be left between tubes to allow for the proper operation of the robots and for the passage of feeder pipes); these may impose minimum spacing requirements.

Figure 5:
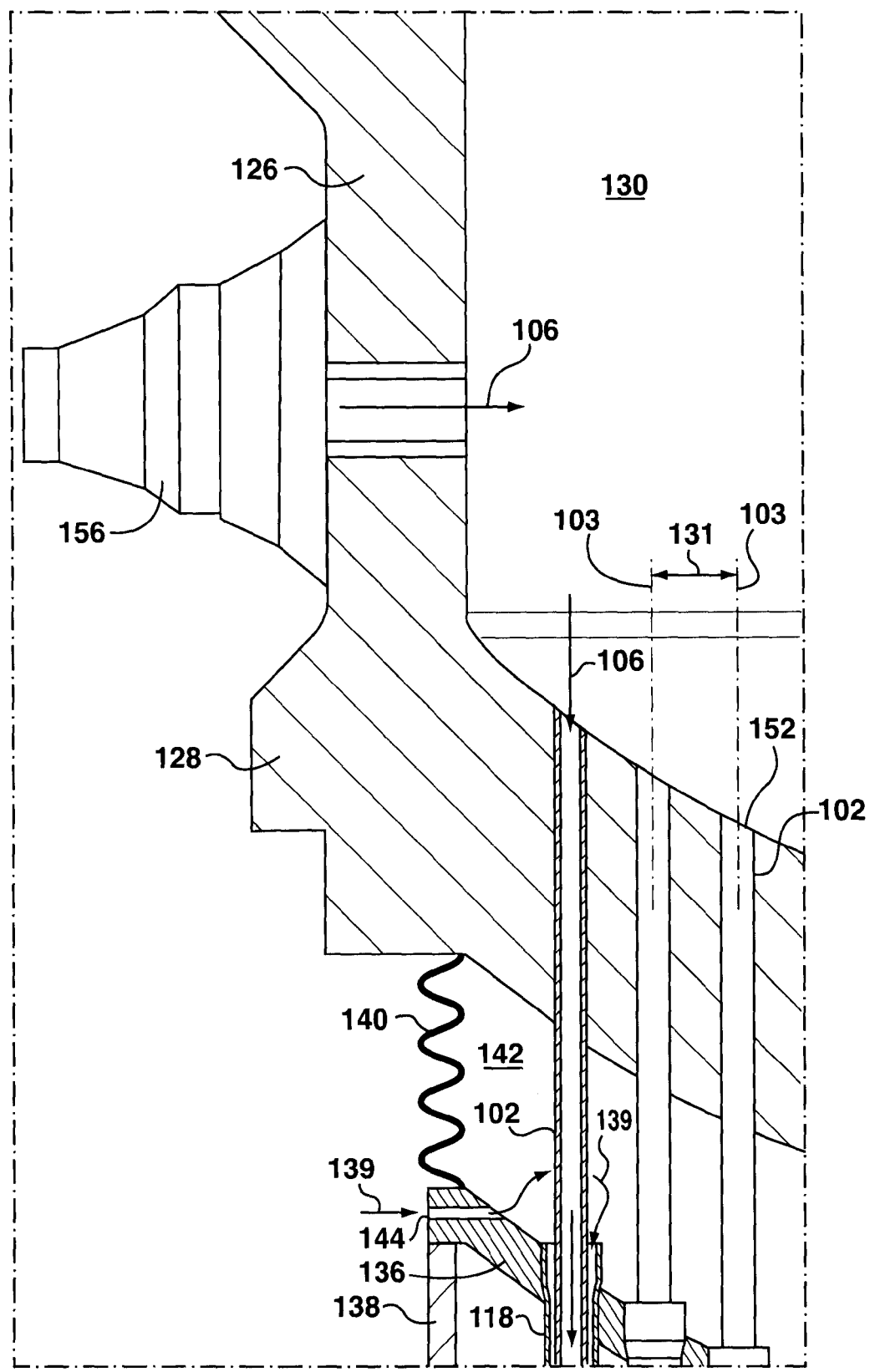
FIG. 5 is an enlarged sectional view of the indicated portion of FIG. 3.
Figure 6A:
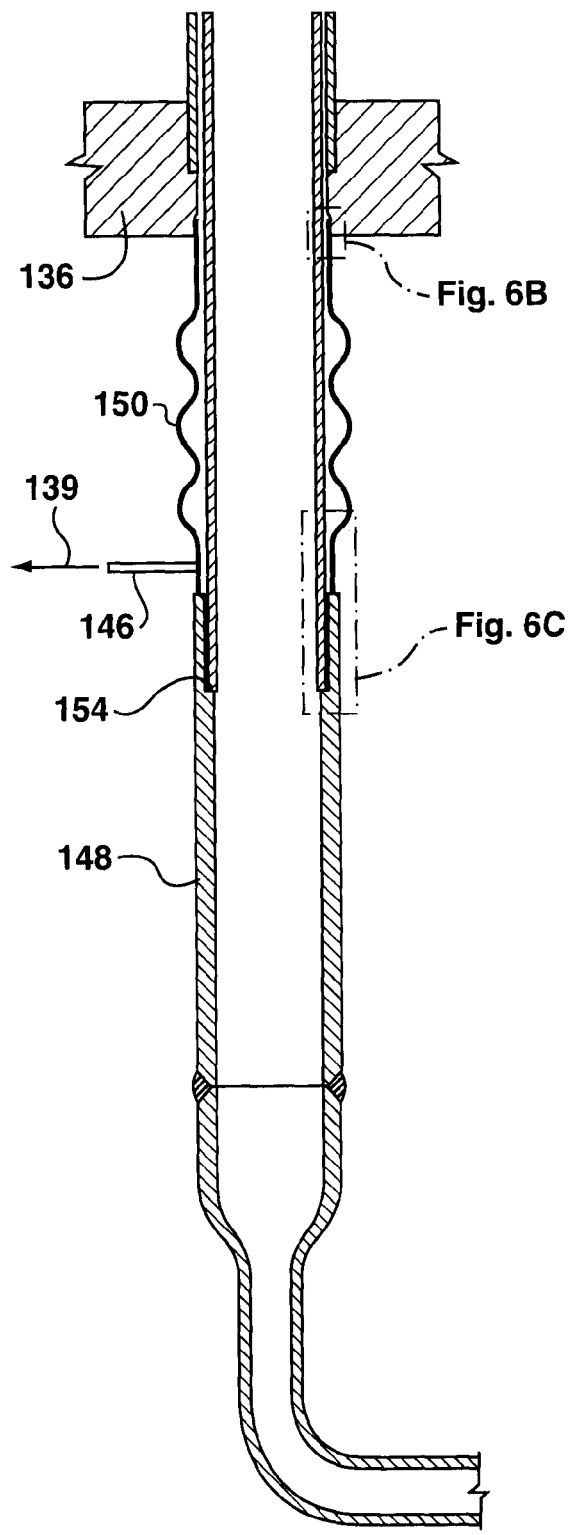
FIG. 6A is an enlarged sectional view of the indicated portion of FIG. 3.
Figure 6B:
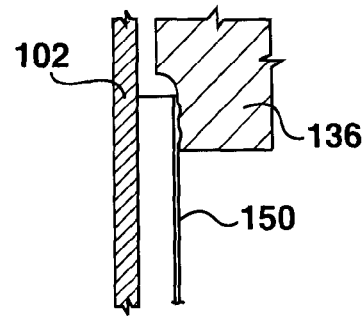
FIG. 6B is an enlarged view of the indicated portion of FIG. 6A.
Figure 6C:
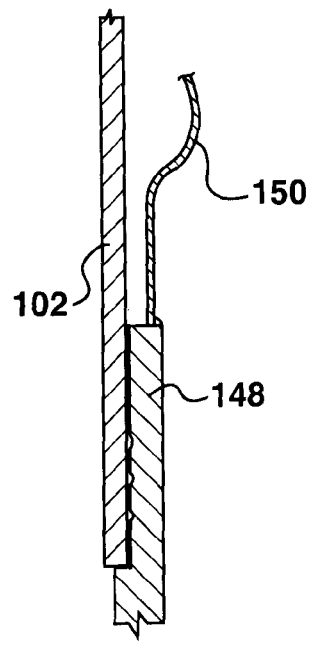
FIG. 6C is an enlarged view of the indicated portion of FIG. 6A.
Figure 7:
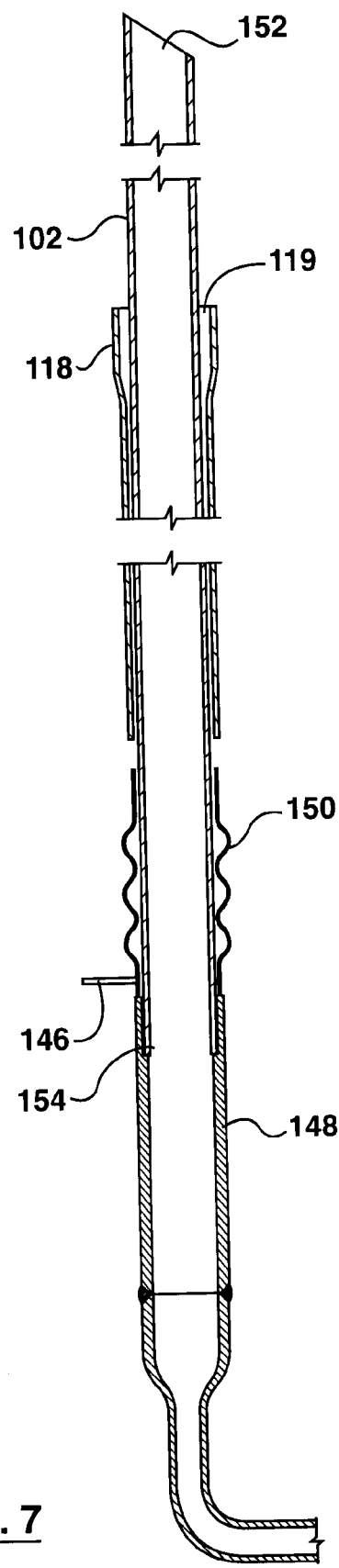
FIG. 7 is a schematic representation of an example of a pressure tube and surrounding calandria tube that can be used in the reactor of FIG. 1.
Figure 8:
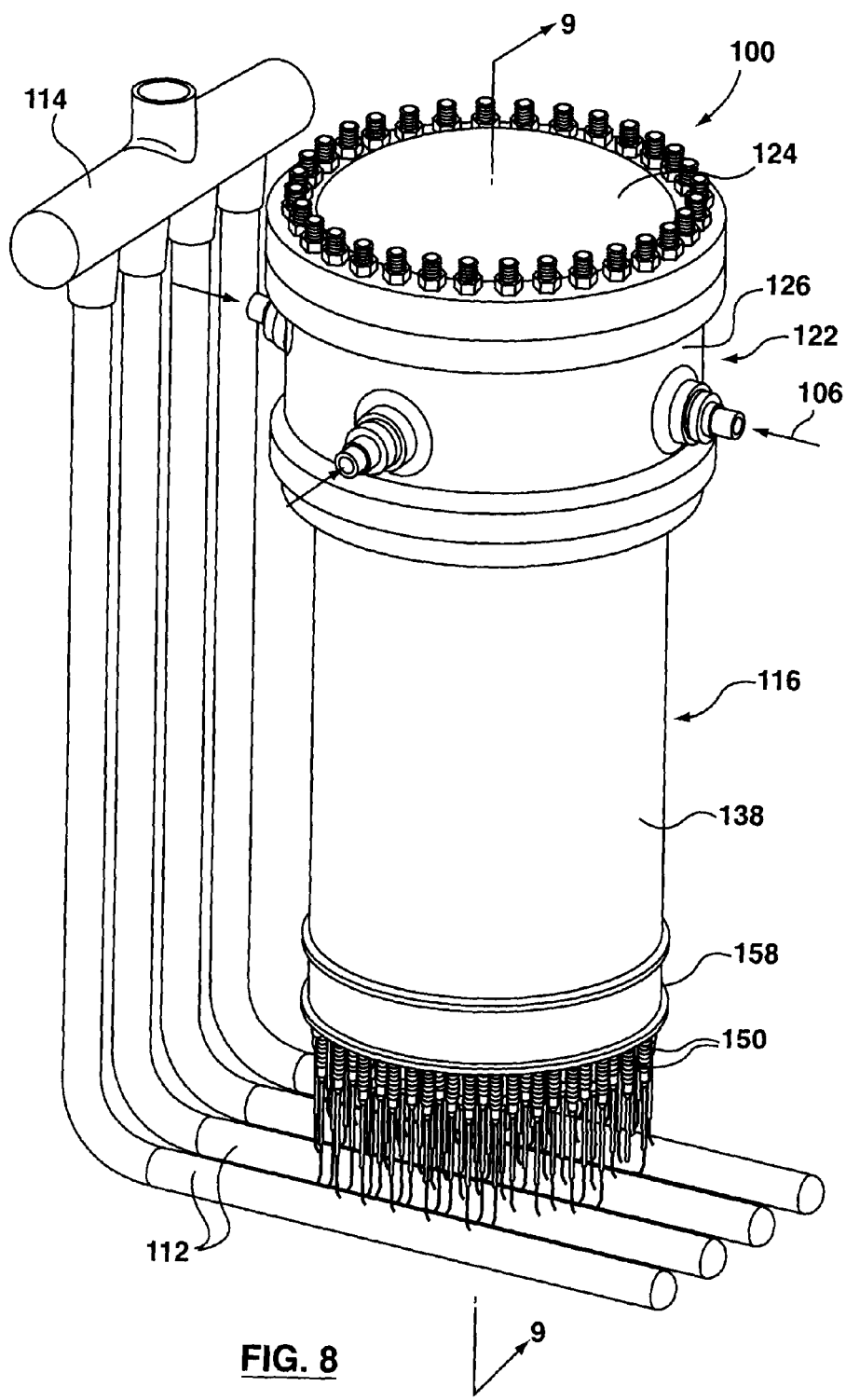
FIG. 8 is an isometric view of another example of a pressure-tube nuclear reactor.

The reactor 100, as exemplified in FIGS. 1 and 8, is a vertically oriented pressure-tube type reactor (as opposed to a horizontal pressure-tube type reactor and a pressure vessel type reactor known in the art), in which the pressure tubes 102 are arranged in a substantially vertical configuration, preferably so that a pressure tube axis 103 defined by the longitudinal axis of any given pressure tube 102 is generally vertical, as illustrated in FIG. 5. In other examples, the reactor 100 can be configured so that the pressure tubes 102 are aligned vertically (as illustrated), horizontally (approximately orthogonal to the illustrated examples) and at any angle therebetween.

In the described examples, all of the pressure tubes 102 in the reactor 100 are all supplied with coolant 106 from a single header or plenum, for example inlet plenum 122. In this example, each pressure tube 102 is supplied with coolant 106 from a common source, the inlet plenum 122, and the reactor 100 is not refueled on-line, because it is not possible to selectively open a portion of the pressure tubes 102 while leaving the remaining pressure tubes 102 in operation. When the reactor 100 is taken off-line (i.e., shut down for maintenance or refueling) the inlet plenum 122 can be opened to allow servicing and batch re-fueling, as described in detail below.

The inlet plenum 122 includes an upper wall portion, for example cover 124 that is detachably connected to, and supported upon the plenum side walls 126. The inlet plenum 122 also includes a lower or bottom wall portion, for example plenum tubesheet 128. Together, the cover 124, side walls 126 and plenum tubesheet 128 cooperate to define an interior volume or chamber 130 for receiving coolant 106 under pressure. The plenum tubesheet 128 includes a plurality of openings 129 or apertures, and each opening 129 is connected to an upper or inlet end 152 of a corresponding pressure tube 102. The pressure tubes 102 can be connected to the plenum tubesheet 128 using any suitable connecting means known in the art, including rolled joints, welded joints and explosion bonding. The number, configuration and arrangement or pitch spacing 131 of the openings 129 in the plenum tubesheet 128 (defined as generally horizontal the distance between tube axes 103) can be any suitable distance and/or configuration known in the art. In some examples the pitch spacing 131 is smaller than the pitch spacing used on conventional pressure-tube reactors. The spacing 131 may be determined from requirements for the nuclear reactor 100.

Each of the cover 124, side walls 126 and plenum tubesheet 128 can be made from any suitable material that provides the desired mechanical characteristics and can withstand the expected operating pressures of the coolant 106, including, for example, stainless steel alloys. In some examples, some or all of the cover 124, side walls 126 and plenum tubesheet 128 can have a wall thickness 125 between 5 cm and 50 cm, and in some examples have a thickness of approximately 40-50 cm.

As illustrated, the plenum side wall 126 is a single, annular or ring-like member that is integrally forged with the plenum tubesheet 128. In other examples, the side wall 126 can be formed from multiple panels or segments, and can be separated from, but sealed to, the plenum tubesheet 128. The plenum side walls 126 can also include one or more inlets or openings for receiving coolant 106, for example coolant nozzles 156. In the illustrated examples, the plenum side wall 126 includes four coolant nozzles 156, spaced equally around the perimeter of the plenum 122, for supply a flow of coolant to the chamber 130.

In some examples, for example when the coolant fluid remains subcritical, the flow of the coolant through the reactor can be reversed, so that coolant enters the pressure tubes 102 via what has been described as the outlet 154, flows along the length of the pressure tubes around the fuel bundles, and exits the pressure tubes via what has been described as inlets 152 into the plenum 122. It is understood that the plenum, for example inlet plenum 122, can function as either an inlet plenum or an outlet plenum.

Optionally, the plenum 122 can include a greater or fewer number of coolant nozzles 156, including, for example, as few as one nozzle. The number of coolant nozzles 156 included in a given reactor 100 can depend on a variety of factors, including expected coolant flow rates, coolant pressure, coolant temperature, plenum size, piping costs, desire for redundant coolant supply and physical space constraints. In some examples, one or more coolant nozzles 156 can be included on the cover 124 and/or the plenum tubesheet 128 (not shown). In such examples additional coolant supply piping may be required and removal of the cover 124 may require the decoupling of the corresponding coolant nozzle 156. The coolant nozzles 156 can be any suitable nozzle, valve or flow regulating device known in the art.

In addition to containing and routing coolant 106, some or all of the cover 124, side walls 126, plenum tubesheet 128 and the volume of coolant 106 retained within the plenum chamber 130 can provide radiation shielding at the top of the reactor 100. In some examples the inlet plenum 122 and coolant 106 can provide a sufficient or desired level of radiation shielding so that the reactor 100 does not require a separate upper shield member. In other examples, the reactor 100 can include a separate upper shield, for example a neutron shield as known in the art (not shown), to provide a desired or required level of radiation shielding toward the top of the reactor 100. A separate shield, if desired, can be located in any suitable location as known in the art, including, for example, between the plenum tubesheet 128 and the calandria 116 and above/surrounding the cover 124.

In the present example, the plenum tubesheet 128 has a generally curved or dome-like shape, which is an efficient shape for withstanding the expected operating pressures within the plenum 122. In other examples, the tubesheet can be generally flat or planar.

The upper portion of the plenum 122, for example cover 124 is also formed as a generally dome-like or curved member to withstand the expected operating pressures of the coolant in the plenum 122. Like the tubesheet 128, in other examples the cover 124 can be a flat plate. The inlet plenum 122 can be constructed from any suitable material, including being forged from a high-temperature steel, such as SA508. The plenum walls can have a thickness between 5 cm-50 cm based on the operating temperature and pressure and the size of the inlet plenum 122. It is understood that characteristics of each of the plenum walls can selected based on the particular operating parameters or conditions of a given reactor 100.

Referring to FIGS. 1, 3, 8 and 9, in addition to the shielding provided by the plenum 122, the calandria vessel 116 can also include a radiation end shield at the lower end of the vessel, for example neutron reflector, shown schematically as neutron reflector 158. The end shield can be any known radiation shield apparatus known in the art, including the neutron reflector 158 that includes an outer shell filled with spherical steel balls. The neutron reflector 158 can be configured to allow the pressure tubes 102 and/or calandria tubes 118 to pass therethrough, depending on the placement of the neutron reflector 158 in a given reactor. Also, although not shown, a neutron shield may be positioned around the cylindrical outer surface of the calandria vessel 116.

In some examples, as exemplified in FIGS. 3, 3A, 4, 5 and 6A-C, the calandria vessel 116 includes a plurality of vertical shell tubes, for example calandria tubes 118, extending the height 132 of the calandria vessel 116, between first and second outer shell tubesheets. In the exemplified vertical orientation the first and second outer shell tubesheets can be an upper calandria tubesheet 134 and an opposing lower calandria tubesheet 136.

Calandria side walls 138 extend between, and surround the periphery of the calandria tubesheets 134, 136, thereby providing an enclosed vessel for containing the heavy water moderator 108. While illustrated as a generally cylindrical vessel, it is understood that calandria 116 can be a vessel of any suitable cross-sectional shape, including square and polygonal.

Each calandria tube 118 is sealed to the upper and lower calandria tubesheets 134, 136 using any suitable connecting means known in the art, including rolled joints and welded joints, thereby preventing moderator liquid 108 from entering the interior of the calandria tubes 118.

Figure 3:
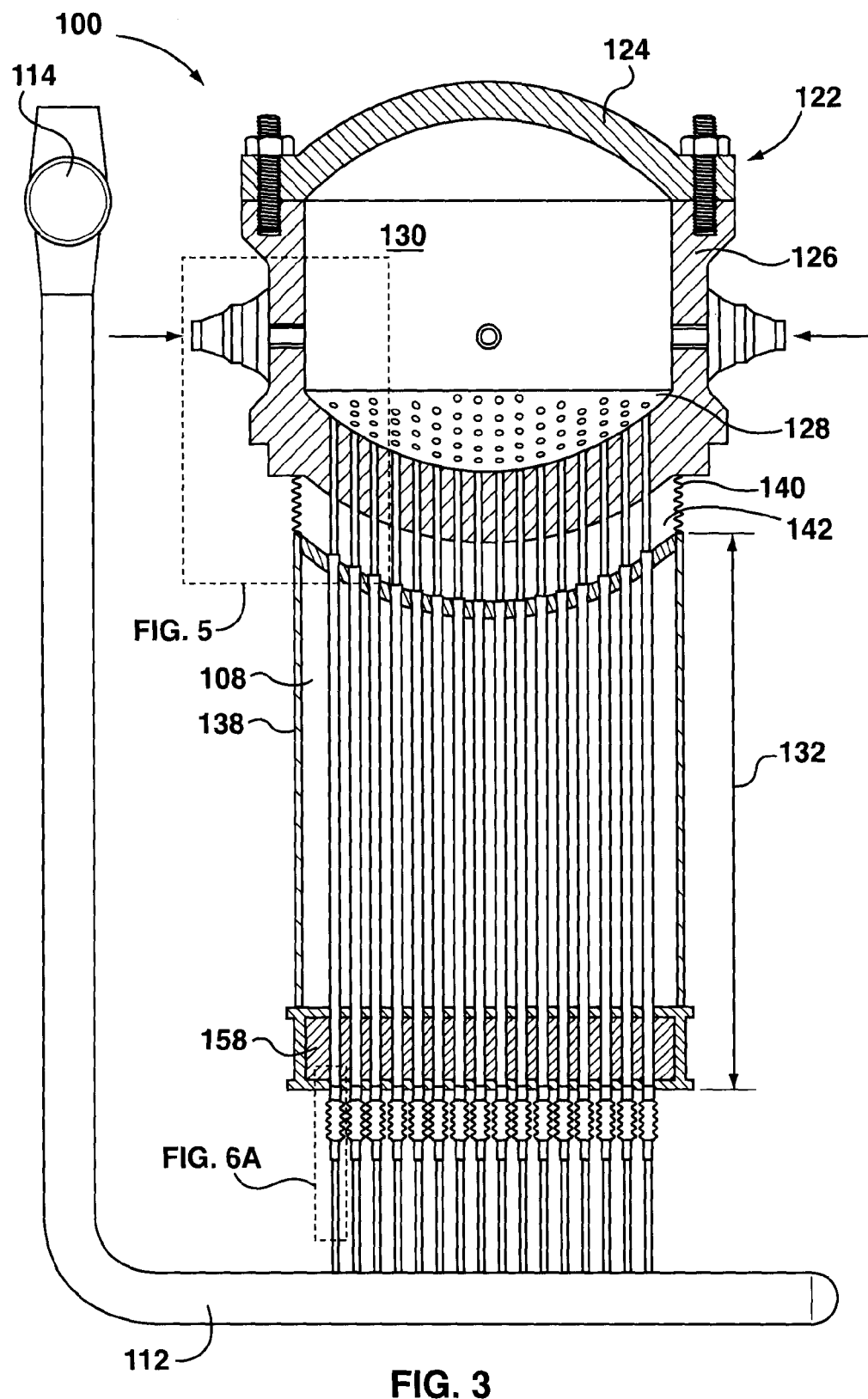
FIG. 3 is a sectional view taken along line 3-3 in FIG. 1.
Figure 3A:
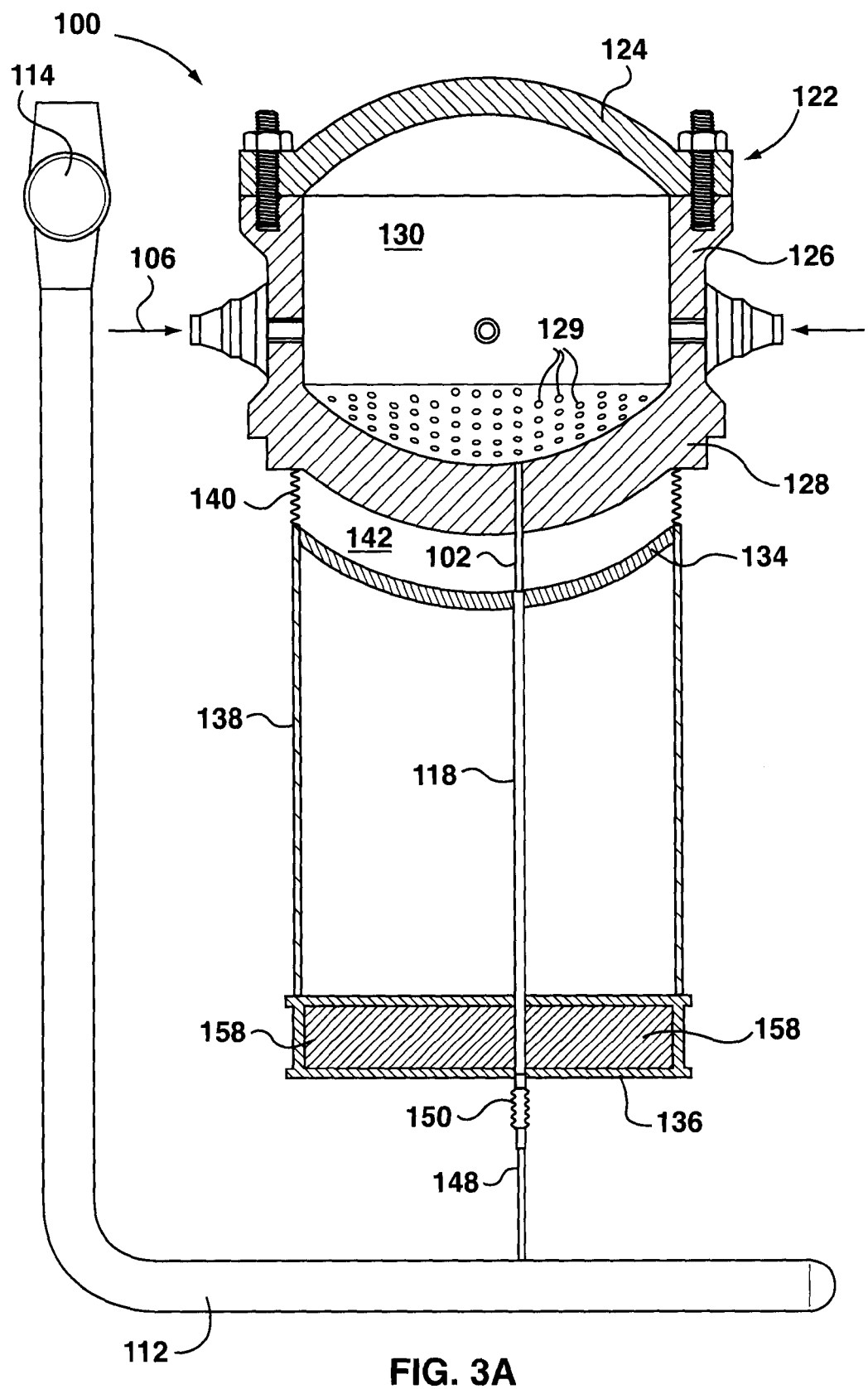
FIG. 3A is the section view of FIG. 3 simplified to include a single pressure tube for clarity.

In examples in which the reactor 100 includes a plurality of calandria tubes 118 as described above, each pressure tube 102 is inserted into a corresponding calandria tube 118, to isolate the pressure tubes 102 from the moderator liquid 108, as illustrated schematically in FIGS. 3-5. Optionally, gas, for example carbon dioxide ($CO_2$), can be circulated within the annular space, or gap 119, defined between the outer surface of the pressure tube 102 and the inner surface of the calandria tube 118 to thermally insulate the pressure tube 102 from the calandria tube 118 and the heavy water moderator fluid 108 contained within the calandria vessel 116. In a known manner, garter springs or other spacers can be provided to maintain a uniform annular spacing. The condition of the gas can be monitored to detect pressure tube 102 leaks.

While FIG. 3 shows a configuration in which the tubesheet 128 also serves as an upper tubesheet for the calandria vessel 116, the calandria vessel 116 may be provided with a separate tubesheet. Referring to FIGS. 1, 3 and 5, one example of a reactor 100 includes an expansion bellows 140 positioned between the plenum tubesheet 128 and the upper calandria tubesheet 134, that can deform or deflect to account for differences in thermal expansion between the materials used to construct the plenum 122 and the calandria 116. In this example a single, annular expansion bellows 140 is used to support the entire inlet plenum 122. In other examples, other types of expansion bellows can be used, with each bellows enclosing one or a group of pressure tubes 102.

Also in this example, a cooling plenum or calandria tube plenum, for example fluid plenum 142 is provided between the lower surface of the inlet plenum 122 and the upper surface of the upper calandria tube sheet 134. As shown in FIG. 5, gas or any other suitable cooling or insulating fluid, for example water or $CO_2$ as described above, can be fed into the fluid plenum 142 via an inlet conduit 144, as illustrated using arrows 139 in FIG. 5. From the fluid plenum 142, the gas flows into the space 119 between the pressure tubes 102 and the calandria tubes 118 and is ultimately withdrawn from the bottom of the reactor 100 via an outlet conduit 146, as shown by arrow 139 in FIG. 6A. Both the inlet and outlet conduits 144, 146 can be any suitable apparatus known in the art, including pipes and flexible hoses, and can include any suitable connections, fittings and flow control means known in the art for handling the particular cooling fluid selected, including, for example, flow control valves and pressure regulators.

In this example, each pressure tube 102 extends through the lower calandria tubesheet 136 and is connected to a transition piping member, for example pressure tube extension conduit 148, that fluidly connects the lower or outlet end 154 of the pressure tube 102 to one of the risers 112. The pressure tube extension conduit 148 can be formed from the same material as the pressure tube 102, or a different material. Depending on the materials involved, the pressure tube extension conduit 148 can be attached to the pressure tube 102 and riser 112 using any known, suitable technique, including welded joints and rolled joints.

When the reactor 100 is in use, the dimensions of the pressure tubes 102 can change as a result of thermal expansion and radiation creep, as known in the art. In some existing, horizontal commercial pressure tube type reactors, in which the pressure tubes are horizontal, the effects of thermal expansion and radiation creep can cause elongation, diametral expansion and, in combination with the pull of gravity, sagging or deflection of the pressure tubes. Such sagging can be undesirable, and horizontal reactors often include garter springs, spacers or other spacing elements to reduce the magnitude of any pressure tube sagging and to maintain the desired annular gap between the pressure tubes and the surrounding calandria tubes.

In contrast, when the pressure tubes 102 are disposed in a vertical orientation, as in reactor 100, thermal expansion and radiation creep generally result in an axial lengthening of the pressure tubes 102, as opposed to a lateral sagging. In this configuration, changes in pressure tube 102 length will generally not generally affect the radial spacing, i.e., the size of the annular gap, between the pressure tube 102 and the surrounding calandria tube 118, which can reduce or eliminate the need for garter springs or other spacing elements between the pressure tubes 102 and the calandria tubes 118.

In some examples, the expansion, or growth, of the pressure tubes 102 may not be consistent or uniform across the reactor 100. For example, local differences in operating temperature, radiation flux, fuel bundle condition and other factors, can lead to differential growth of the pressure tubes 102. That is, some pressure tubes 102 can grow or lengthen by a greater or lesser amount than other pressure tubes 102 in the same reactor 102. For example, pressure tubes 102 located toward the centre of the reactor 100 may be exposed to a greater amount of radiation flux and, over time, may grow or extend more than pressure tubes 102 located toward the periphery or outer edges of the reactor 100.

To account for the thermal expansion and creep of the pressure tubes 102 described above, some or all of the pressure tube extension conduits 148 can include an expansion member, for example tube expansion bellows 150, that is configured to deform and/or deflect to absorb the axial growth or elongation of the pressure tube 102 during use, for example, as shown in FIGS. 6A-C and 7. Because each pressure tube 102 in the reactor 100 may grow at a different rate, and by a different amount, each pressure tube 102 can be provided with an individual tube expansion bellows 150, so that each pressure tube 102 can freely expand relative to its surrounding pressure tubes 102.

Additionally, expansion members provided at the lower ends of the pressure tubes 102, between the pressure tubes 102 and the risers 112, enables the reactor 100 to compensate for the differential pressure tube 102 creep and thermal expansion (lengthening) experienced when the reactor 100 is in use, and may reduce the amount of stress exerted on the risers 112 by the pressure tubes 102. In a known manner, such expansion members include curved sections of tube that can more easily absorb expansion strains.

Alternatively, or in addition, the risers 112 can be connected to a riser support, for example the collection header 114 in the example shown, in such a manner that the weight of the risers 112 is supported by the connection at a first or supported end to the riser support, and the second end of the riser 112, for example the lower portions of the risers 112, need not be directly connected to the calandria 116 or other support surfaces. In such a configuration, portions of the risers 112 are only indirectly coupled to the outer shell of the reactor 100 and are free to expand as the reactor is in use (for example due to thermal expansion). The configuration and material of the risers 112, and the mounting point for the risers 112, can be selected so that the amount of thermal expansion experienced by the risers 112 is approximately the same as the thermal expansion experienced by the calandria 116 and pressure tubes 102. In such a configuration, the risers 112 can grow with the pressure tubes 102, which may help to accommodate at least a portion of the thermal expansion of the pressure tubes 102. Tube expansion bellows 150 may still be provided in such a configuration to accommodate the long term (or at least longer term) radiation induced creep of the pressure tubes 102.

The size and number of the risers 112 can be determined by safety and leak analyses, and may include variations in the diameter, thickness, material and numbers of connections. Alternatively, the outlet ends of the pressure tubes 102, for example pressure tube extensions 148, can be directly connected to the collection header 114, eliminating the need for larger, stiffer risers 112. Connecting the pressure tubes 102 directly to the collection header 114 may also help accommodated for the differential growth between the pressure tubes 102, as the smaller diameter pressure tubes 102 can be more flexible than the risers 112.

Figure 11:
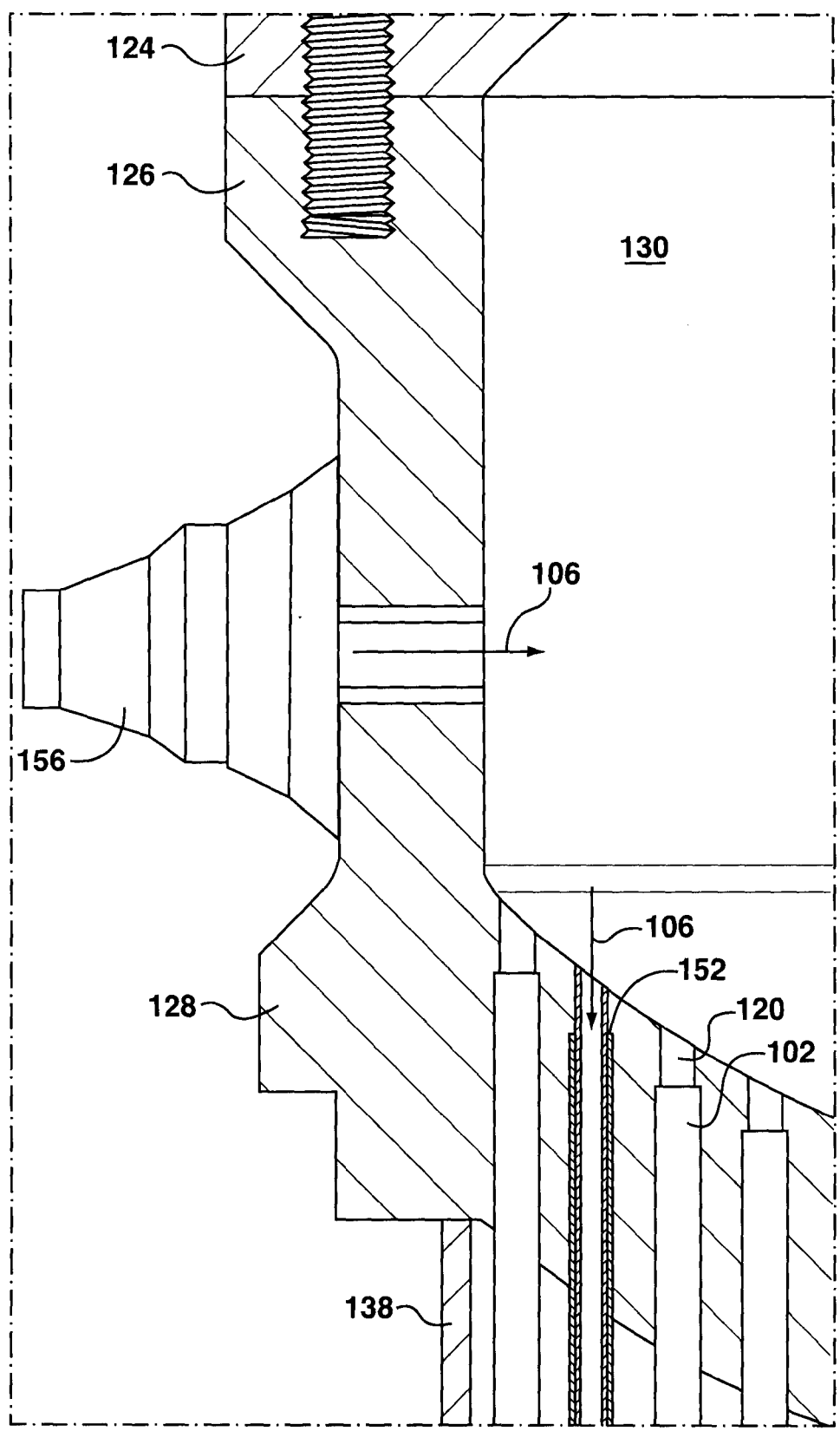
FIG. 11 is an enlarged sectional view of the indicated portion of FIG. 9.
Figure 12:
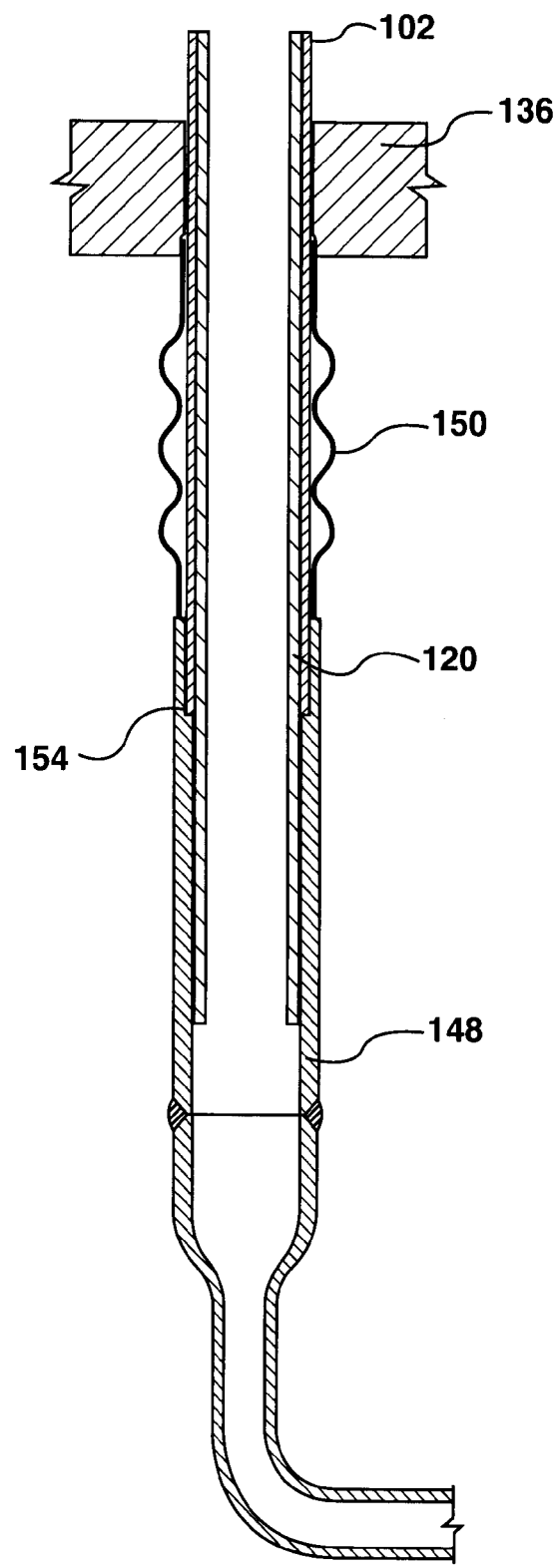
FIG. 12 is an enlarged sectional view of the indicated portion of FIG. 9.
Figure 13:
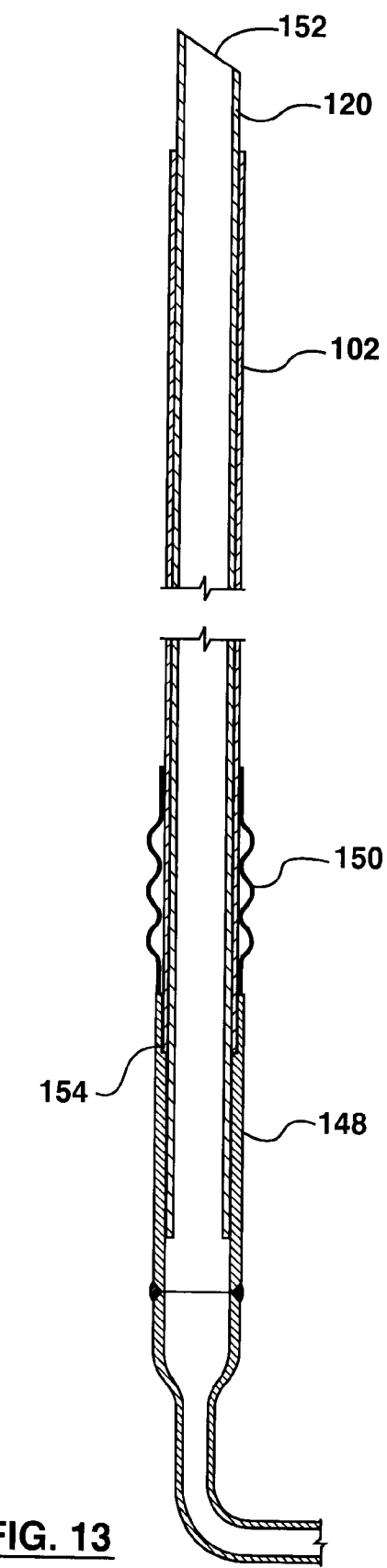
FIG. 13 is a schematic representation of a pressure tube that can be used in the reactor of FIG. 8.

In another example, as exemplified in FIGS. 8-13 the reactor 100 may not include calandria tubes 118, and the pressure tubes 102 can be submerged in, and have direct contact with, the heavy water moderator contained in the calandria vessel 116. In such examples, the pressure tubes 102 can be sealed to the plenum tubesheet 128 in any suitable manner, extend through the interior of the calandria vessel 116 and pass through the lower calandria tubesheet 136, as described above. In this example, the pressure tubes 102 pass through the lower calandria tubesheet 136 (as shown in FIG. 12) and are sealed to an appropriate portion of the reactor, for example to the pressure tube extension 148 and/or the tube expansion bellows 150 (using any suitable means). In this configuration, the moderator fluid can flow into the tube expansion bellows 150, between the tube expansion bellows 150 and the pressure tubes 102. While not shown in the figures, it is understood that additional piping and conduits can be provided to drain the moderator fluid from within the tube expansion bellows 150 and circulate it back into the calandria vessel 116.

Figure 9:
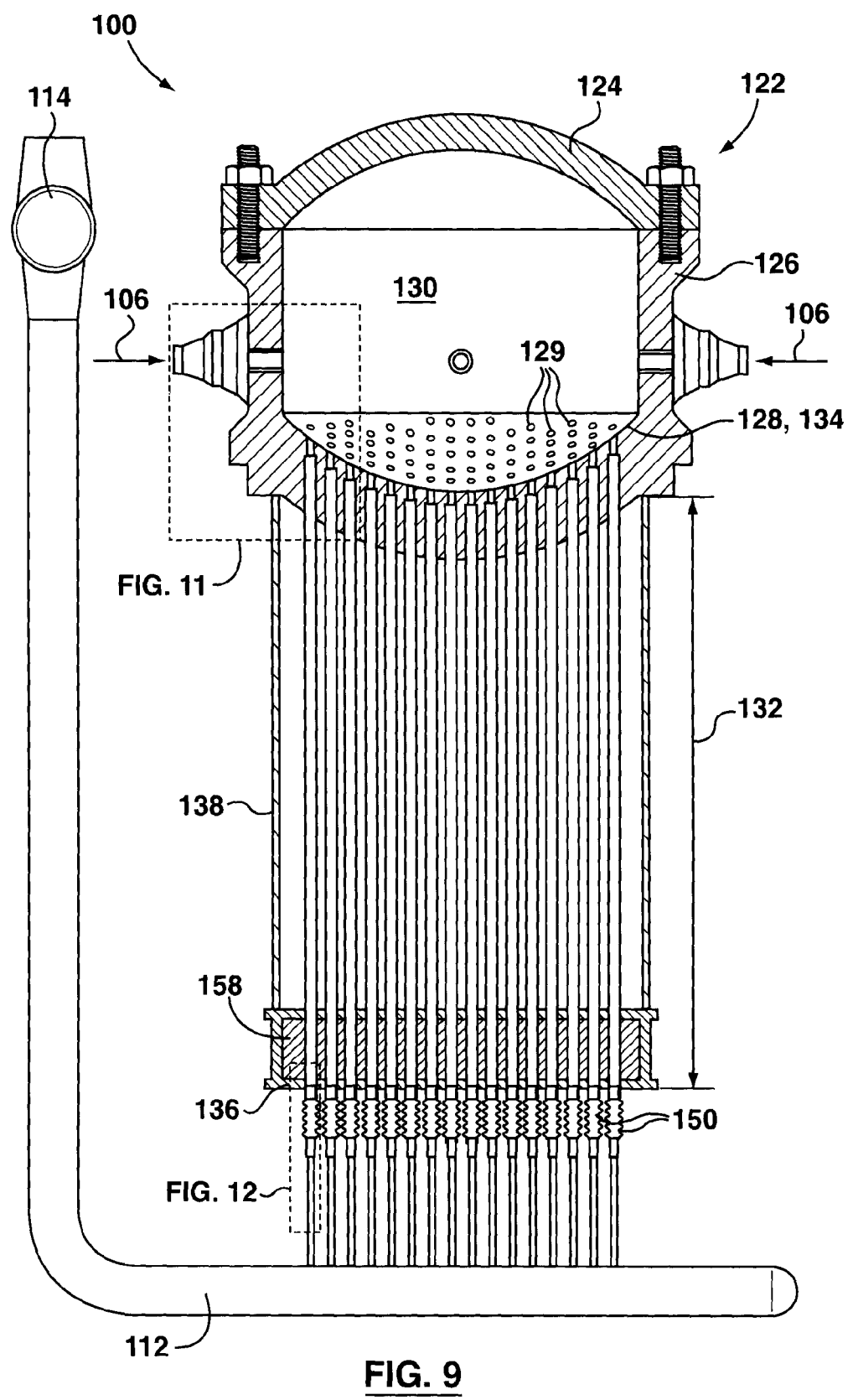
FIG. 9 is a sectional view taken along line 9-9 in FIG. 8.
Figure 10:
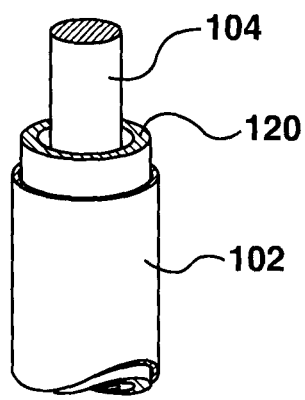
FIG. 10 is a schematic representation of a pressure tube that can be used in the reactor of FIG. 9.

Optionally, in this configuration the calandria vessel 116 may not include an upper calandria tubesheet 134, and the plenum tubesheet 128 can form the upper surface that encloses the calandria 116 as shown in, for example, FIGS. 9 and 11. Depending on the expected operating temperatures of the coolant 106 and the desired operating temperature of the moderator 108, the plenum tubesheet 128 can be insulated to inhibit heat transfer through the plenum tubesheet 128, between the coolant 106 to the moderator 108. Thermal insulation provided on the plenum tubesheet 128 can be provided as a separate element, for example a ceramic coating, or may be incorporated into the material of the plenum tubesheet 128 itself.

In this example, each pressure tube outlet 154 is fluidly connected to a corresponding riser 112 using a pressure tube extension conduit 148 and can optionally incorporate a tube expansion bellows 150, as described in detail above. Optionally, although not shown, the reactor 100 in FIGS. 8-13 and 14 can also include a calandria expansion bellows, for example expansion bellows 140 from FIGS. 1-7.

As exemplified in FIGS. 10-13, in some instances, for example when the coolant 106 is a high-temperature supercritical fluid, additional or alternative thermal insulators can be used to protect and thermally insulate the pressure tubes 102 from the coolant 106. Optionally, an insulating element, for example insulator liners 120, can be inserted inside the pressure tubes 102, covering the inner surfaces of the pressure tubes 102. The insulators 120 can be formed form any material having the desired combination of thermal insulating properties, high corrosion resistance and low neutron absorption, including, for example, ceramic zirconia. In some examples, the insulator liner 120 is porous, allowing a portion of the coolant 106 to pass through and/or become retained within the insulator 120.

The insulator liners 120 can be loosely received within the pressure tubes 102, and may be provided in segments, enabling substantially all of the pressure load exerted by the coolant 106 to be carried by the walls of the pressure tubes 102, as opposed to the insulators 120. In such a configuration, the insulator liners 120 need not be capable of withstanding the pressure difference between the coolant 106 and the moderator liquid 108. In other examples, the insulator liners 120 can be constructed to withstand some or all of the pressure drop between the coolant 106 and the moderator 108. It is understood that insulator liners 120 can be used in any of the examples described herein, including in reactors 100 that include calandria tubes 118, in combination with or as substitute for the presence of $CO_2$ gas.

Insulating the pressure tubes, for example using either $CO_2$ gas (as shown in FIGS. 1-7) or insulators 120 (as shown in FIGS. 8-13) or both, can reduce the heat loss or heat transfer from the heated coolant 106 to the cooler, moderator 108, enabling the pressure tubes 102 to be operated at lower temperatures while still providing coolant 106 with an exit temperature that is sufficiently high to generate the desired steam flows.

In some examples, instead of or in addition to the thermal insulator 120 disposed inside each pressure tube 102, as illustrated in FIG. 10-13, thermal insulators can be provided in the space 119 between the pressure tube 102 and the calandria tube 118 (not shown).

Figure 2:
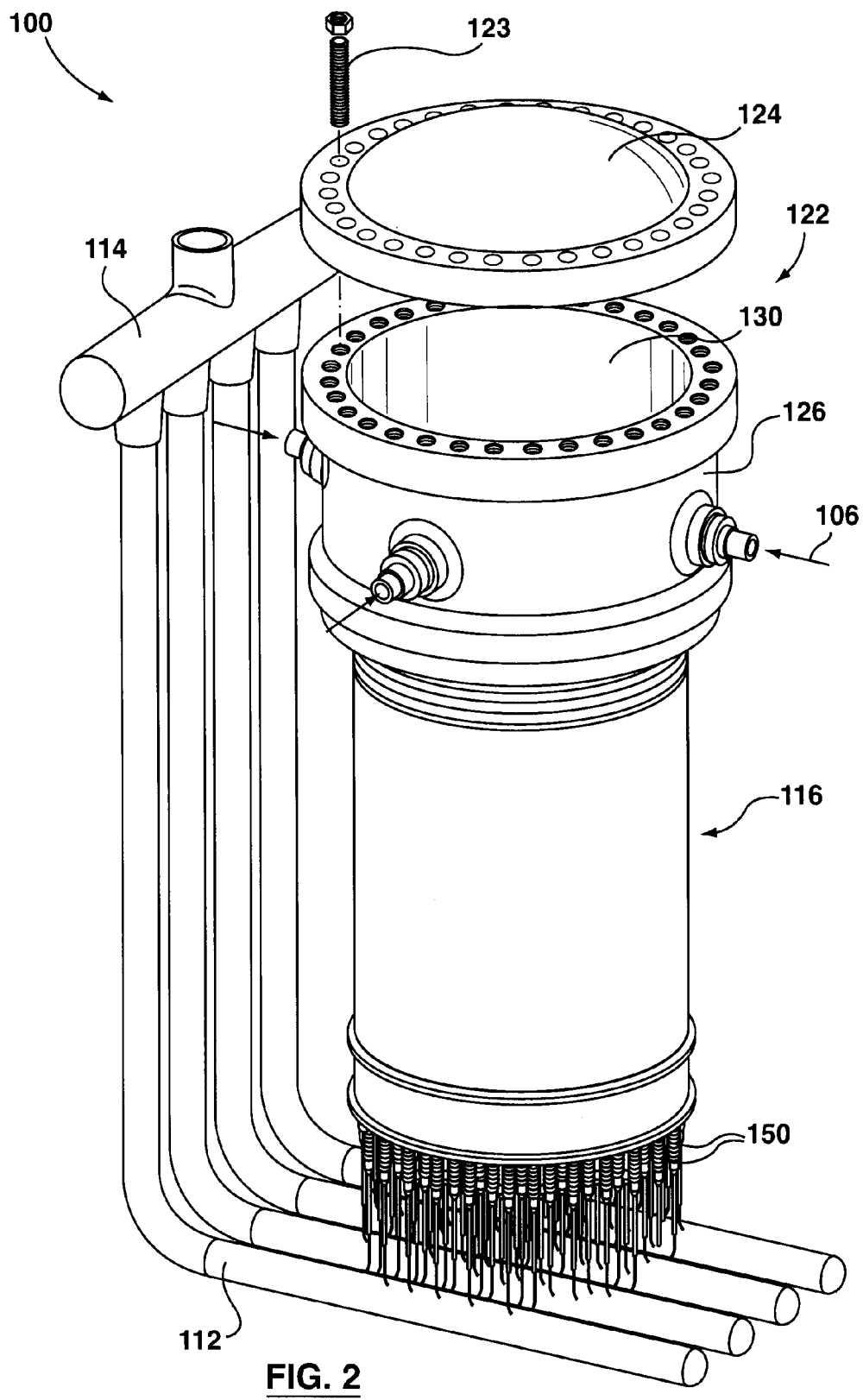
FIG. 2 is a partially exploded isometric view of the nuclear reactor of FIG. 1.

Referring to FIG. 2, in any example of the reactor 100, the plenum cover 124 can be removed from the inlet plenum 122, for example by removing the plurality of bolts 123 holding the cover 124 in place, to allow access to the plenum chamber 130 and the interior of the pressure tubes 102. Access to the pressure tubes 102 enables a user to remove depleted fuel bundles 104 and replace them with new fuel bundles 104. Due to known reactor characteristics, the fuel bundles 104 within the reactor 100 may not be consumed at the same rate. For example, fuel bundles 104 positioned toward the centre of the reactor 100 may be exposed to a greater concentration of neutrons and may be consumed at a faster rate than fuel bundles 104 located toward the periphery of the reactor 100. In such instances, and operator may chose to re-shuffle or rotate the position of the fuel bundles 104 to re-balance the reactor 100, as is known in the art. Removing the cover 124 enables the operator to rotate all of the fuel bundles 104 if desired.

When a user wishes to replace some or all of the used fuel bundles 104 in the pressure tubes 102, removing the cover 124 enables a user to exchange some or all of the fuel bundles 104 in the reactor 100 in a single batch process, for example using an overhead crane (not shown), with appropriate tooling, to simultaneous grasp and extract the selected, used fuel bundles 104 in a single operation. Such a crane could also be operable to grasp a plurality of fresh fuel bundles and to insert all of the fresh fuel bundles into a corresponding fuel holding apparatus or fuel holder, provided within each pressure tube, in a single step. Because the inlet plenum is empty, unlike existing PWR and BWR designs, no reactor internals need to be removed to get access to the fuel channels and fuel strings, enabling refueling to be performed in a time-effective manner.

Figure 14:
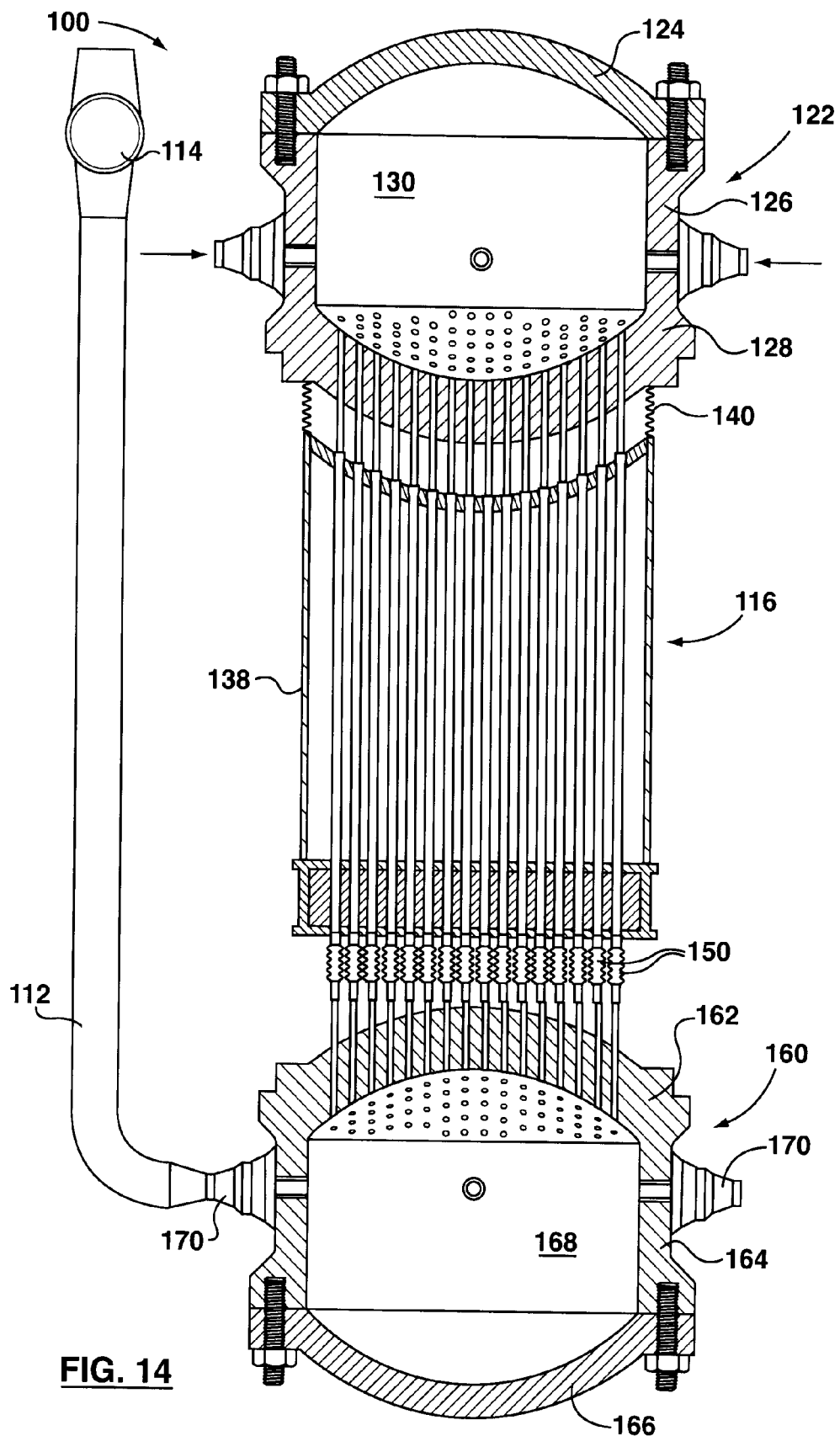
FIG. 14 is a sectional view of another example of a pressure-tube nuclear reactor having both inlet and outlet coolant plenums.

Referring to FIG. 14, another example of a reactor 100 includes an upper or inlet plenum 122 and a lower or outlet plenum 160. Like inlet plenum 122, the outlet plenum 160 includes an outlet plenum tubesheet 162, outlet plenum side walls 164 and an outlet plenum cover 166 that cooperate to define an outlet plenum chamber 168. The outlet plenum 160 can include generally the same features as the inlet plenum 122, as explained in detail above.

Optionally, the outlet plenum cover 166 can be removable, like cover 124, to allow access to the outlet plenum chamber 168 and the outlets ends 154 of the pressure tubes 102 for inspection and maintenance. The reactor 100 can also be configured so that some or all of the fuel bundles in the reactor 100 can be accessed from the bottom of the reactor 100, via outlet plenum chamber 168. In such configurations, some or all of the pressure tubes 102 can be re-fueled from the bottom as well as, or as an alternative to, being re-fueled from the top as described above. To accomplish the bottom side re-fueling process an operator may use a jack or lifting apparatus (not shown) instead of an overhead crane.

Optionally the outlet plenum tubesheet 162 is connected to the downstream end of the pressure tube extension conduits 148, downstream from the tube expansion bellows 150 and/or other expansion joints to accommodate the differential expansion of the pressure tubes 102, as explained above. In this example a single outlet plenum 160 can collect the coolant 106 from all of the pressure tubes 102 and can replace of the risers 112. The outlet plenum 160 includes at least one, and in some examples four outlet nozzles 170, that can be connected to collection header 114 using any suitable conduit, duct or pipe network.

In other examples, the outlet plenum tubesheet 162 can be connected directly to the outlet ends 154 of the pressure tubes 102, without intervening pressure tube extension conduits 148.

In any of the examples described herein, the pressure tubes 102 and the calandria tubes 118 can be formed from any suitable material that has the desired mechanical properties, radiation resistance and sufficiently high neutron transmissibility, as known in the art. In some examples, the pressure tubes, calandria tubes and any other suitable component of the reactors can be made from a material having a neutron absorption cross-section (or capture cross section of between 150-300 mb. In some examples, the pressure tubes 102 and the calandria tubes 118 can be formed from zirconium alloys known in the art to be substantially transparent to neutrons generated during the nuclear reaction. Optionally, the material of the pressure tubes 102 and calandria tubes 118 can be selected to have a low thermal conductivity.

In the present examples, the interior of the inlet plenums 122 and/or 160, for example chambers 130, 168, are configured as a continuous, open cavity. In the above examples, the coolant 106 will tend to divide reasonably uniformly amongst the pressure tubes 102 because the pressure losses in the pressure tubes 102 are significantly higher than the pressure losses in the inlet plenum 122. The coolant flow rate through each of the pressure tubes 102 does not need to be exactly the same, but preferably does not vary by more than necessary as set by variations in, or the peak-to-average ratio of, the channel powers. This ratio may be determined by flow and power analysis, and achieved using flow limiting devices (e.g. orifices) of known state of the art. In some examples the flow rate of coolant through each pressure tube 102 is within 25% of the mean flow rate value through the pressure tubes (i.e. the total coolant flow rate/the number of pressure tubes).

In other examples, the inlet plenum 122 (and optionally the outlet plenum 160) can include any suitable flow control or regulating elements to help evenly distribute of coolant in the plenum 122 amongst the pressure tubes 102. Examples of such flow control elements include fins, plates, nozzles, orifice plates at the inlet end 152 of each pressure tube 102 and flow channels or conduits. Optionally, the interior of the inlet plenum 122 can be sub-divided into two or more discrete chambers, each of which can be separately supplied with coolant 106 from a respective coolant nozzle 156. Providing two or more discrete chambers within the plenum may allow separate control of the coolant flow rate and conditions (for example temperature and pressure), in each chamber.

While the fuel channels in the reactor 100 are described as pressure tubes 102 and illustrated as substantially cylindrical or pipe-like members, it is understood that the fuel channels can be of any suitable cross-sectional shape and configuration known in the art, including, for example, oval, arcuate, polygonal and rectangular cross-sectional shapes.

While not described in detail, it is understood that the reactor 100 can include any known reactivity mechanisms (both in and out of the reactor core), reactor control devices and reactor safety devices known in the art, for example as used with existing heavy water moderated pressure-tube type reactors. Such devices can include, for example, control rods, liquid neutron poisons, shut off rods, liquid zone controllers, etc.

It is understood that fail-safe control rods (not shown) are one example of a reactor shutdown system that is configured to rapidly and automatically terminate reactor operation. Control rods can introduce negative reactivity by absorbing excess neutrons when inserted between pressure tubes.

Optionally, the control rods penetrate the calanria vessel 116 at an angle and operate on a fail-safe principle such that, in the event of an emergency reactor trip, the clutches that keep each control rod in its storage position are de-energized causing the control rods to be inserted or dropped into the calandria vessel 116 under the force of gravity. In some examples, the reactor 100 can be controlled by one or more various reactivity control devices including liquid zone controllers, adjuster rods and absorber rods.

One example of a liquid zone controller includes a plurality of fixed control rods with controllable light-water filled compartments. Optionally, the liquid zone controllers can be positioned horizontally, penetrating the calandria vessel 116 in a horizontal plane. By changing the level of $H_2O$ in individual compartments, reactivity of the core can be changed locally.

Optionally, adjuster rods (which are normally inserted fully in the core) can be partially moved out to change reactivity. The adjuster rods can extend horizontally.

Optionally the absorber rods can be similar to the fail-safe control rods, and can be used for fast power reduction. The absorber rods can be configured to be gravity fed, in the same manner described above, and hence, they can oriented at an angle from the vertical.

What has been described above has been intended to be illustrative of the invention and non-limiting and it will be understood by persons skilled in the art that other variants and modifications may be made without departing from the scope of the invention as defined in the claims appended hereto.

The invention claimed is:

1. A pressure-tube nuclear reactor comprising:
    an outer shell having at least one shell side wall and a shell tubesheet that cooperate to define an interior to contain a heavy water moderator at a first pressure;
    a coolant plenum having a plenum cover, at least one plenum side wall and a plenum tubesheet that cooperate to define a plenum chamber to receive a coolant fluid at a second pressure, the second pressure being greater than the first pressure, wherein the plenum tubesheet seals an open end of the outer shell and is in physical contact with the heavy water moderator;
    a plurality of pressure tubes received within and extending through the interior of the outer shell from the plenum tubesheet to at least the shell tubesheet, each pressure tube configured to releasably retain at least one fuel bundle and having an outer surface in direct physical contact with the heavy water moderator, a first end of each pressure tube being coupled to the plenum tubesheet in fluid communication with the plenum chamber and a second end of each pressure tube fluidly connected to a coolant conduit to enable the coolant fluid to flow between the coolant plenum and each pressure tube and to flow from the nuclear reactor for further processing; and
    an insulator liner disposed within each pressure tube to inhibit heat transfer between the coolant fluid and the pressure tube.

2. The nuclear reactor of claim 1, wherein the plurality of pressure tubes extend substantially vertically through the interior of the outer shell.

3. The nuclear reactor of claim 1, wherein each insulator liner is porous and a portion of the coolant fluid is retained within each insulator liner.

4. The nuclear reactor of claim 1, wherein each insulator liner comprises at least one ceramic insulator liner loosely received within each pressure tube.

5. The nuclear reactor of claim 1, wherein the plenum is an inlet plenum fluidly connected to at least one coolant supply conduit to receive the coolant fluid and direct the coolant fluid into the plurality of pressure tubes.

6. The nuclear reactor of claim 5, wherein the first end of each pressure tube defines a pressure tube inlet and the second end of each pressure tube defines a pressure tube outlet, each pressure tube outlet fluidly connected to a coolant outlet conduit.

7. The nuclear reactor of claim 6, wherein the coolant outlet conduit comprises at least one riser, a first end of the at least one riser being fluidly connected to a coolant collection header and a second end of the at least one riser being coupled to the plurality of pressure tube outlets, the at least one riser supported by coupling the first end of the at least one riser to a riser support to allow the second end of the at least one riser to accommodate thermal expansion.

8. The nuclear reactor of claim 6, wherein each pressure tube outlet is fluidly connected to the coolant outlet conduit using expansion joints.

9. The nuclear reactor of claim 1, wherein the moderator is pressurized at a first pressure that is less than 1 MPa and the plenum chamber is configured to receive the coolant fluid at a second pressure that is between 8-15 MPa so that the coolant fluid is a subcritical fluid.

10. The nuclear reactor of claim 1, wherein the moderator is pressurized at a first pressure that is less than 1 MPa and the plenum chamber is configured to receive the coolant fluid at a second pressure that is between 23-28 MPa so that the coolant fluid exiting the second end of each pressure tube is a supercritical fluid.

11. The nuclear reactor of claim 1, wherein the plenum chamber is sized to hold a pre-determined volume of coolant fluid so that in use, substantially all radiation shielding for a portion of the nuclear reactor covered by the coolant plenum is provided by the coolant plenum and the pre-determined volume of coolant fluid.

12. The nuclear reactor of claim 1, further comprising an expansion bellows disposed between the coolant plenum and the outer shell to accommodate thermal expansion of at least one of the coolant plenum, the pressure tubes and the outer shell.

13. The nuclear reactor of claim 1, wherein the plurality of pressure tubes have a neutron absorption cross-section between 150-300 mb.

14. The nuclear reactor of claim 1, wherein the second end of each pressure tube is coupled to the outer shell by a respective tube expansion bellows to accommodate for longitudinal growth of each pressure tube.

15. The nuclear reactor of claim 1, wherein the coolant fluid is heavy water or light water.

16. The nuclear reactor of claim 1, further comprising a second coolant plenum comprising a second plenum tubesheet coupled to the second ends of the plurality of pressure tubes and a second plenum chamber to receive the coolant fluid from the plurality of pressure tubes and direct the coolant fluid to the coolant outlet conduit.

17. The nuclear reactor of claim 1, wherein at least one of the insulator liners is formed from ceramic zirconia.

18. The nuclear reactor of claim 1, wherein the insulator liners have a failure pressure at which the insulator liners will fail, and the second pressure is greater than the failure pressure.

19. The nuclear reactor of claim 1, wherein the plenum tubesheet comprises a plenum surface in contact with the coolant fluid in the plenum chamber and an opposed moderator surface in physical contact with the heavy water moderator.

20. The nuclear reactor of claim 1, wherein the plenum tubesheet is convexly curved toward the outer shell.

21. The nuclear reactor of claim 1, further comprising at least one flow regulating element disposed within the plenum chamber to distribute the coolant fluid amongst the pressure tubes.

22. The nuclear reactor of claim 1, wherein a total coolant flow rate divided by the number of pressure tubes in the reactor defines a mean flow rate and wherein a flow rate of coolant fluid through each pressure tube is within 25% of the mean flow rate.

23. The nuclear reactor of claim 1, wherein the insulator liners are removably disposed within the pressure tubes.

24. The nuclear reactor of claim 1, wherein the plenum tubesheet has a wall thickness of between about 40 cm and about 50 cm.

25. A coolant containment system for a nuclear reactor having an outer shell containing a liquid moderator, the coolant containment system comprising:
    a plenum connectable to an outer shell of a nuclear reactor and having a fluid connection for connecting to a coolant processing system, the plenum comprising a plenum tubesheet and a plenum sidewall extending from the plenum tubesheet to define a plenum chamber and when the plenum is connected to the outer shell the plenum tubesheet seals an open end of the outer shell and is in physical contact with a liquid moderator contained within the outer shell;
    a plurality of pressure tubes connected at first ends thereof to the plenum tubesheet, the pressure tubes being adapted to receive nuclear fuel bundles and to be mounted within the outer shell and in physical contact with the liquid moderator, and second ends of the pressure tubes fluidly connected to the coolant processing system, the plenum chamber being openable to provide simultaneous access to an interior of the plenum chamber and the plurality of pressure tubes;
    whereby coolant can be circulated through the coolant processing system, the plenum and the pressure tubes and wherein the moderator is pressurized at a first pressure and the plenum chamber is configured to receive the coolant fluid at a second pressure that is at least 7 MPa greater than the first pressure and the coolant fluid exiting the second end of each pressure tube is a supercritical fluid.

26. The coolant containment system of claim 25, wherein the plenum tubesheet is a pressure barrier between the coolant fluid in the plenum chamber and the moderator and can resist pressure differentials of at least 22 MPa.

27. The coolant containment system of claim 25, further comprising an insulator liner disposed within each pressure tube to inhibit heat transfer between the coolant fluid and the pressure tube.

28. The coolant containment system of claim 27, wherein at least one of the insulator liners is formed from ceramic zirconia.

29. The coolant containment system of claim 25, wherein the plenum chamber is configured to receive the coolant fluid at a pressure that is between 23-28 MPa.

30. The coolant containment system of claim 25, wherein the plenum tubesheet has a wall thickness of between about 40 cm and about 50 cm.

31. A pressure-tube nuclear reactor comprising:
    an outer shell having, at least one shell side wall and a shell tubesheet that cooperate to define an interior to contain a heavy water moderator at a first pressure;

a coolant plenum having a plenum cover, at least one plenum side wall and a plenum tubesheet that cooperate to define a plenum chamber to receive a coolant fluid at a second pressure, the second pressure being greater than the first pressure and the plenum tubesheet is a pressure barrier between the coolant fluid in the plenum chamber and the heavy water moderator contained in the outer shell and can resist pressure differentials of at least 22 MPa; and a plurality of pressure tubes received within and extending through the interior of the outer shell from the plenum tubesheet to at least the shell tubesheet, each pressure tube configured to releasably retain at least one fuel bundle and having an outer surface in direct physical contact with the heavy water moderator, a first end of each pressure tube being coupled to the plenum tubesheet in fluid communication with the plenum chamber and a second end of each pressure tube fluidly connected to a coolant conduit to enable the coolant fluid to flow between the coolant plenum and each pressure tube and to flow from the nuclear reactor for further processing.

32. The nuclear reactor of claim 31, wherein the first end of each pressure tube defines a pressure tube inlet and the second end of each pressure tube defines a pressure tube outlet, each pressure tube outlet fluidly connected to a coolant outlet conduit.

33. The nuclear reactor of claim 31, further comprising an insulator liner disposed within each pressure tube to inhibit heat transfer between the coolant fluid and the pressure tube.

34. The nuclear reactor of claim 33, wherein the insulator liners are removably disposed within the pressure tubes.

35. The nuclear reactor of claim 31, wherein the plenum tubesheet comprises a plenum surface in physical contact with the coolant fluid in the plenum chamber and an opposed moderator surface in physical contact with the heavy water moderator.

36. The nuclear reactor of claim 31, wherein the plenum tubesheet is convexly curved toward the outer shell.

37. The nuclear reactor of claim 31, wherein each insulator liner comprises at least one ceramic insulator liner loosely received within each pressure tube.

* * * * *